(12) United States Patent
Argarwal et al.

(10) Patent No.: US 11,335,062 B2
(45) Date of Patent: May 17, 2022

(54) AUTOMATED APPAREL DESIGN USING MACHINE LEARNING

(71) Applicant: Accenture Global Solutions Limited, Dublin (IE)

(72) Inventors: Payal Argarwal, Mumbai (IN); Vaibhav Kumar Daga, Jaipur (IN); Parag Rane, Thane (IN); Prasanna Srinivasa Rao, Bengaluru (IN); Ratan Yashwant Panjwani, Thane (IN)

(73) Assignee: Accenture Global Solutions Limited, Dublin (IE)

( * ) Notice: Subject to any disclaimer, the term of this patent is extended or adjusted under 35 U.S.C. 154(b) by 103 days.

(21) Appl. No.: 16/994,270

(22) Filed: Aug. 14, 2020

(65) Prior Publication Data
US 2022/0051479 A1    Feb. 17, 2022

(51) Int. Cl.
| | |
|---|---|
| *G06T 17/20* | (2006.01) |
| *G10L 15/26* | (2006.01) |
| *A41D 1/00* | (2018.01) |
| *G06N 3/04* | (2006.01) |
| *G06F 40/35* | (2020.01) |
| *G06N 20/00* | (2019.01) |

(52) U.S. Cl.
CPC ............. *G06T 17/20* (2013.01); *A41D 1/00* (2013.01); *G06F 40/35* (2020.01); *G06N 3/04* (2013.01); *G06N 20/00* (2019.01); *G10L 15/26* (2013.01)

(58) Field of Classification Search
CPC .......... G06T 17/20; G06F 40/35; G06N 20/20
USPC ......................................................... 345/419
See application file for complete search history.

(56) References Cited

U.S. PATENT DOCUMENTS

| | | | |
|---|---|---|---|
| 2014/0277683 A1* | 9/2014 | Gupta | A41H 3/007 700/132 |
| 2017/0273383 A1* | 9/2017 | deGuzman | G06Q 30/0641 |
| 2018/0049498 A1* | 2/2018 | Koh | G05B 19/4097 |
| 2019/0125022 A1* | 5/2019 | George | G06Q 30/0621 |

(Continued)

OTHER PUBLICATIONS

Myntra web page, https://www.myntra.com/tshirts/kook-n-keech-marvel/kook-n-keech-marvel-men-black-marvel-printed-round-neck-t-shirt/8972451/buy, last accessed Aug. 17, 2020.

(Continued)

*Primary Examiner* — Thomas J Lett
(74) *Attorney, Agent, or Firm* — Norton Rose Fulbright US LLP

(57) ABSTRACT

Aspects of the present disclosure provide systems, methods, and computer-readable storage media facilitating automated apparel design using deep learning techniques. For example, user instructions may be received as text data (or converted to text data from audio data representing user speech), and natural language processing (NLP) may be performed on the text data to interpret the user instructions. An apparel design may be generated in real-time/substantially real-time based on the user instructions. For example, the interpreted user instructions may be provided as input to at least one machine learning (ML) model that is configured to determine one or more visual apparel elements based on the user instructions and to generate the apparel design based on the visual apparel elements. One or more operations may be initiated based on the apparel design.

20 Claims, 6 Drawing Sheets

(56) References Cited

U.S. PATENT DOCUMENTS

2020/0146397 A1* 5/2020 Coupe .................... G06T 19/00
2020/0375293 A1* 12/2020 Koh .................. G06Q 30/0621

OTHER PUBLICATIONS

H&M Group web page, https://hmgroup.com/media/news/general-news-2019/hmgroup-new-era-design.html, last accessed Aug. 17, 2020.
Nike web page, https://www.nike.com/in/u/custom-kd13-by-you-1000834/8899127970#Builder, last accessed Aug. 17, 2020.
Spreadshirt web page, https://www.spreadshirt.com/create-your-own, last accessed Aug. 17, 2020.
Zalando web page, https://www.zalando.co.uk/weekday-sunday-demin-shorts-web22F00r-q11.html, last accessed Aug. 17, 2020.

* cited by examiner

AUTOMATED APPAREL DESIGN USING MACHINE LEARNING

TECHNICAL FIELD

The present invention relates generally to automated apparel design using machine learning.

BACKGROUND

Fashion and apparel design continues to be a growing industry throughout the world. Apparel design is typically associated with significant manual activity, such as an individual or group of designers using their creativity to create new designs and to implement these designs in apparel. As technology advances, improvements have been made to apparel design processes. For example, designers may use software that enables the designers to create apparel designs and view the designs using controls and tools provided by the software. However, even with such improvements, apparel design continues to require significant manual activity to create new apparel designs, often based on quickly changing local, regional, or global trends.

Additionally, customers often have limited options when purchasing apparel. For example, a customer may imagine a particular apparel design they would like to purchase, but the customer is limited to selecting the closest option from an inventory of apparel provided by a brick-and-mortar or online retailer. Some retailers may offer a few options for customers to design their own apparel, such as for bulk orders, but such options typically include the customer communicating with a designer to describe the desired design, and the designer subsequently creating a design using their skills and expertise based on the customer's description. Because the customer is not typically involved in the design process beyond providing the initial description, the resulting apparel may not match the customer's desires, which may result in a lost sales opportunity or a returned product and refund request, in addition to inefficient use of the designer's time and labor. Moreover, although the designers may have access to software or other electronic tools for designing apparel, the customer does not generally have such access, and the software or electronic tools may be too complicated for a customer with little or no apparel design experience to successfully leverage to implement the desired design.

SUMMARY

The present application discloses systems, methods, and computer-readable storage media for supporting automated apparel design using machine learning. Additionally, the systems, methods, and computer-readable storage media described herein may enable a user to provide apparel design instructions as text or speech input, the instructions may be extracted from the input, and an apparel design may be automatically generated in real-time/substantially real-time based on the instructions. To improve user satisfaction with the apparel design, user sentiment may be determined based on additional inputs from the user, and the apparel design may be refined or otherwise modified based on the determined user sentiment, as well as or in addition to social media feedback, related user recommendations, or a combination thereof. Thus, the present disclosure provides techniques for supporting automated apparel design that includes the user in the design process and that does not require manual activity from a designer.

In aspects, a server may receive input data from a user device, such as a computer, a mobile phone, a laptop computer, a tablet computer, or another type of electronic device. The input data may include text data that represents user instructions for designing apparel or audio data that represents user speech that includes the user instructions. If the input data includes audio data, the server may perform speech-to-text conversion to generate text data based on the audio data. If the input data includes text data, or after generating text data based on the audio data, the server may extract the user instructions from the text data. For example, the server may perform natural language processing (NLP) on the text data to interpret the user instructions from the text data. The NLP may include vectorization of the text data and named entity detection, such as one or more entities associated with apparel descriptions, design elements, other particular useful words or phrases for use in apparel design, and the like.

After performing the NLP, the server may generate an apparel design based on the interpreted user instructions in real-time/substantially real-time. The apparel design process may be performed using deep learning techniques. As a non-limiting example, generating the apparel design may include providing the interpreted instructions as input to at least one machine learning (ML) model that is trained and executed at the server. In some implementations, the at least one ML model may include a first ML configured to indicate visual design elements based on the interpreted instructions, also referred to as text-to-image synthesis, and a second ML model configured to perform neural style transfer to combine the visual design elements and apparel content to generate the apparel design. In some implementations, the first ML model may include or correspond to one or more neural networks configured to operate as generative adversarial networks, and the second ML model may include or correspond to a multi-layer convolutional neural network. In other implementations, the first ML model, the second ML model, or both, may include or correspond to other types of ML models or constructs, such as support vector machines (SVMs), decision trees, random forests, classification models, regression models, or the like. Additionally or alternatively, the at least one ML model may include a single ML model or more than two ML models. After generating the apparel design, the server may initiate one or more operations based on the apparel design, such as transmitting data indicating the apparel design to the user device, storing the data at a memory, or initiating a transaction based on the apparel design, as non-limiting examples.

In some implementations, the server may initiate a virtual display of a virtual scene that includes a representation of the user wearing a representation of apparel having the apparel design. Such a display may be done on a display monitor, using neural-style transfer (e.g., a ML-based virtual changing room) along with virtual reality (VR), augmented reality (AR), and the like. For example, the server may initiate display of a "virtual changing room" that enables the user to see a representation of their designed apparel on the user's body (or a user's avatar). To illustrate, the user device may include a camera that captures image data (or video data) of the user and provides the image data to the server. The server may extract portions of the image data that include the user to generate the representation of the user, in addition to displaying virtual apparel having the apparel design generated as described above. The server may provide the user with various controls for controlling aspects of the virtual changing room, such as rotating or magnifying the view, approving the apparel design, rejecting the apparel design, viewing additional virtual apparel options (e.g., preconfigured apparel designs, or the server may generate multiple apparel designs based on the user instructions, and the user may be permitted to select others of the multiple apparel designs), and the like. In this manner, the user may be able to determine whether the apparel design(s) generated by the server are acceptable to the user prior to purchasing apparel, which may improve user satisfaction with the apparel or reduce a likelihood of a return and refund request.

In some implementations, the server may be configured to determine a user sentiment associated with the apparel design. For example, the server may determine the user sentiment based on one or more user-selected controls for the virtual changing room. To illustrate, the server may generate a relatively high score based on the user accepting the apparel design, and the server may generate a relatively low score based on the user rejecting the apparel design or selecting to view other options. The user-selected controls may be identified from text data from the user device, audio data representing user speech from the user device, or by performing gesture detection on the image data from the user device. As another example, the server may determine the user sentiment based on audio data from the user device. For example, the user may speak commands for controlling the virtual changing room, and the server may process the audio data (representing the user speech) and extract various features, such as audio levels, audio frequencies, spectral energies, and the like. The audio features may indicate an emotional state of the user associated with the apparel design, such as happiness, indifference, frustration, or the like, and the server may determine the user sentiment based on the audio features. As another example, the server may determine the user sentiment based on the image data. For example, the server may perform facial state recognition on the image data to extract various facial features. The facial features may indicate the emotional state of the user associated with the apparel design, and the server may determine the user sentiment based on the facial features. The user sentiment may be provided as feedback to the apparel design process for use in training the ML models, which may refine the apparel designs output by the ML models based on user instructions. In some implementations, the process of providing the user sentiment for training the ML models and generating additional apparel designs after the training may be performed until at least one apparel design is approved by the user.

In some implementations, the ML models may be trained based on social media data. For example, the server may generate and transmit social media messages that indicate the apparel design to one or more social media networks. In some implementations, the server may be provided with access to social media networks on behalf of the user, and the social media messages may be distributed to user-specific social media networks, feeds, friends lists, and the like. Additionally or alternatively, the server may distribute the social media messages via social media networks associated with an operator of the server, or via publicly-available social media networks. The server may obtain social media data from the social media networks based on distributing the social media messages. The social media data may indicate other's responses or sentiment to the apparel design, such as indicated by views of the social media messages, comments, "likes," sharing of the social media messages, and the like. The server may process the social media data and determine public sentiment associated with the apparel design, and the public sentiment may be used as training data for the ML models to further refine the apparel design process.

In some implementations, the server may modify one or more aspects of the apparel design based on user profiles. To illustrate, the server may create and maintain a user profile for the user. The user profile may indicate historical apparel purchases or apparel design selections, historical user sentiment data, other information, or a combination thereof. The server may compare the user profile to other user profiles to identify one or more similar user profiles, and the server may modify one or more aspects of the apparel design based on the similar user profiles. For example, the server may add, remove, or modify a design element to match design elements of apparel designs indicated by the similar user profiles. Additionally or alternatively, the server may provide user sentiment data indicated by the similar user profiles for training the ML models.

The present disclosure describes techniques that provide technology-based improvements compared to other apparel design techniques. For example, the present disclosure describes performing NLP on input data to interpret user instructions, which enables a user to describe a desired apparel design in words, instead of using complicated apparel design software or relying on a human designer to anticipate design details imagined by the user. Additionally, by providing the virtual changing room, the user is involved throughout the design process instead of at the beginning and the end, which may result in apparel designs associated with increased user satisfaction. Additionally, by using deep learning techniques performed by one or more ML models, the apparel design may be generated in real-time/substantially real-time and without requiring activity of a human designer. Further, by determining user sentiment based on indirect user input, such as audio levels, facial states, and the like, the apparel design may be refined to more closely match what the user anticipates in a natural manner, which may improve user satisfaction with the apparel design and with the design process. Although described above as applying to apparel design, the techniques described herein may be applied to other design domains, such as design of virtual apparel or appearance (e.g., "skins") for avatars, video game characters, VR or AR models or characters, or other virtual characters or models, design of print media or digital media, design of other customizable goods, and the like.

In a particular aspect, a method for automated machine learning for visual design includes receiving, by one or more processors, input data from a user device. The input data indicates one or more user instructions. The method also includes extracting, by the one or more processors, the one or more user instructions from the input data. The method includes performing, by the one or more processors, natural language processing (NLP) on the extracted one or more user instructions to generate processed instruction data. The method also includes generating, by the one or more processors, an apparel design in real-time/substantially real-time based on the processed instruction data. Generating the apparel design includes: providing the processed instruction data as input to at least one machine learning (ML) model. The at least one ML model is configured to determine one or more visual apparel design elements based on the input and to determine the apparel design based on the one or more visual apparel design elements. The method further includes initiating one or more operations based on the apparel design.

In another particular aspect, a non-transitory computer-readable storage medium stores instructions that, when executed by one or more processors, cause the one or more processors to perform operations for automated machine learning for visual design. The operations include receiving input data from a user device. The input data indicates one or more user instructions. The operations also include extracting the one or more user instructions from the input data. The operations include performing natural language processing (NLP) on the extracted one or more user instructions to generate processed instruction data. The operations also include generating an apparel design in real-time/ substantially real-time based on the processed instruction data. Generating the apparel design includes: providing the processed instruction data as input to at least one machine learning (ML) model. The at least one ML model is configured to indicate one or more visual apparel design elements based on the input and to determine the apparel design based on the one or more visual apparel design elements. The operations further include initiating one or more operations based on the apparel design.

In another particular aspect, a system for automated machine learning for visual design includes a memory and one or more processors communicatively coupled to the memory. The one or more processors are configured to receive input data from a user device. The input data indicates one or more user instructions. The one or more processors are also configured to extract the one or more user instructions from the input data. The one or more processors are configured to perform natural language processing (NLP) on the extracted one or more user instructions to generate processed instruction data. The one or more processors are also configured to generate an apparel design in real-time/substantially real-time based on the processed instruction data. Generating the apparel design includes providing the processed instruction data as input to at least one machine learning (ML) model. The at least one ML model is configured to determine one or more visual apparel design elements based on the input and to determine the apparel design based on the one or more visual apparel design elements. The one or more visual apparel design elements include text, logos, patterns, colors, apparel components, design sizes, design locations, or a combination thereof, indicated by the processed instruction data. The one or more processors are further configured to initiate one or more operations based on the apparel design.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

Figure 1:
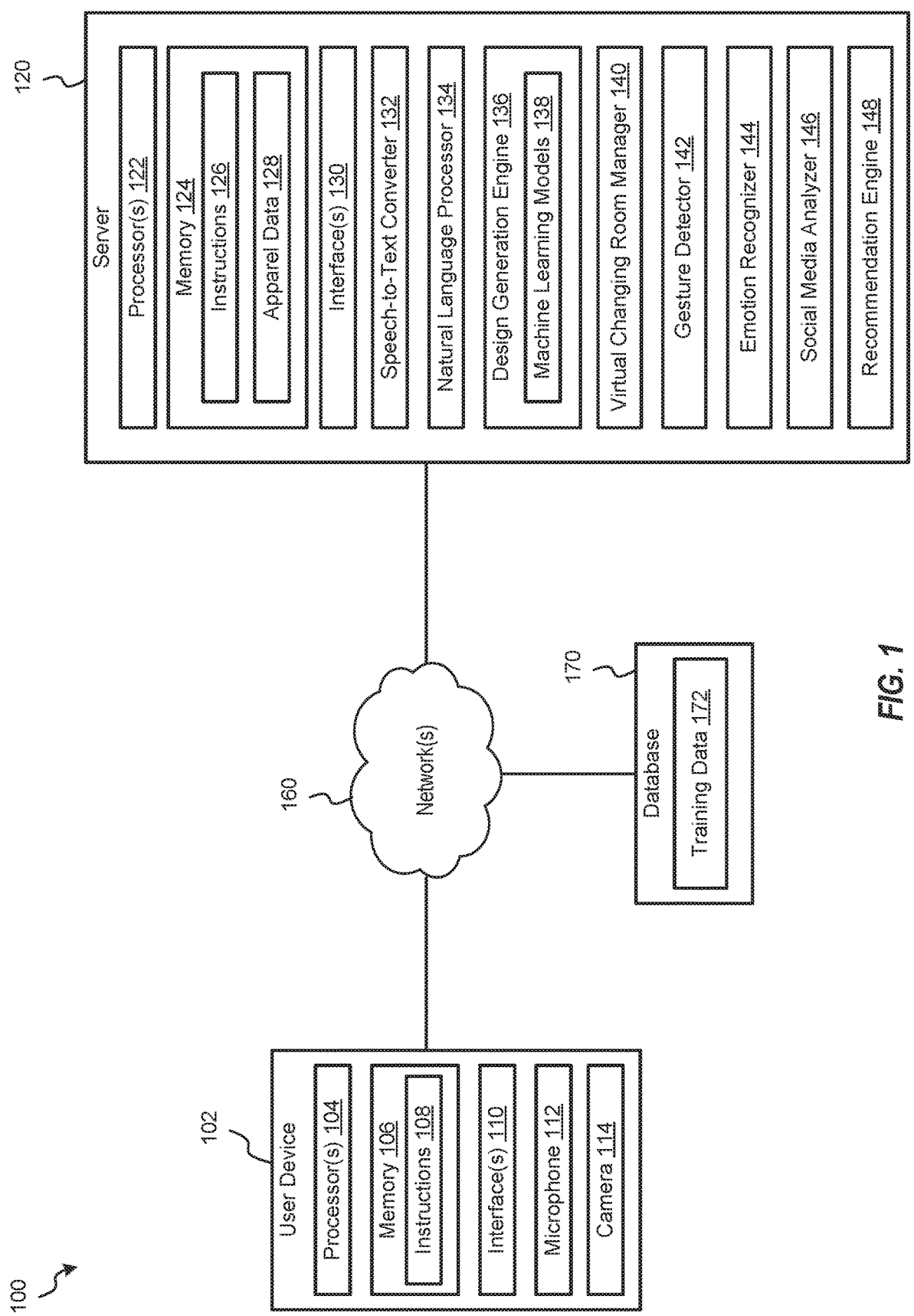
FIG. 1 is a block diagram of an example of a system for automated machine learning apparel design according to aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Aspects of the present disclosure provide systems, methods, and computer-readable storage media facilitating automated apparel design using deep learning techniques. For example, the techniques described herein may perform apparel design based on user instructions using machine learning (ML) models, such as neural networks or other ML models, to generate an apparel design including one or more visual elements based on user instructions. To illustrate, at least one ML model may be configured to identify visual design elements indicated by the user instructions and to combine the visual design elements with apparel content to generate the apparel design. The user instructions may be provided as text data or audio data representing user speech, and, after selective speech-to-text conversion on the audio data to generate text data, natural language processing (NLP) may be performed on the text data to interpret the user instructions. In this manner, the user may be enabled to describe a desired apparel design in a natural way (e.g., using words or phrases), and the user instructions may be interpreted and used as input for the ML models to generate the apparel design. For example, the interpreted user instructions may include vectors based on the text data and/or recognized entities within the text data, and the at least one ML model may be configured to convert or map the vectors and/or the recognized entities to images of respective apparel design elements and to generate the apparel design that incorporates the apparel design elements.

In some implementations, a virtual scene of a "virtual changing room" may be displayed, such as at a display of a user device, a virtual reality (VR) display, or augmented reality (AR) display, to enable the user to visualize how the apparel design will appear when worn by the user. The virtual changing room may be generated using neural-style transfer (e.g., a ML-based virtual changing room) along with an AR/VR based changing room. Additionally or alternatively, user sentiment associated with the apparel design may be determined and used to further train the at least one ML model, which may refine the apparel design generated by the at least one ML model. In this manner, the present disclosure provides techniques for automated apparel design that may be performed in real-time/substantially real-time and that substantially reduce (or eliminate) manual activity by a human designer. Additionally, the apparel design may be refined based on user sentiment, public sentiment (determined based on social media data, as further described herein), or a combination thereof, which may increase the likelihood of the apparel design matching the user's desired apparel design, thereby increasing user satisfaction with the apparel design and the likelihood that the user will purchase apparel having the apparel design.

Referring to FIG. 1, an example of a system for automated machine learning apparel design according to aspects of the present disclosure is shown as a system 100. The system 100 may be configured to perform automated apparel design in real-time/substantially real-time (e.g., accounting for processing needs of the various aspects being utilized), based on user instructions. For example, the system 100 may be configured to support deep learning techniques to generate apparel design(s) without requiring activity of a human designer, as described in further detail below. The system 100 may also be configured to perform NLP to interpret the user instructions, thereby enabling a user to provide instructions naturally via text or speech. In some implementations, the system 100 may be configured to determine user sentiment and/or public sentiment associated with the apparel designs, and to generating training data based on the user sentiment and/or public sentient to further refine the apparel design process. As used herein, "apparel" may include garments (e.g., shirts, pants, shorts, dresses, skirts, blouses, jackets, ties, coats, scarfs, shawls, socks, leggings, stockings, underwear, belts, and the like), headwear (e.g., hats, caps, veils, visors, toboggans, and the like), footwear (e.g., shoes, boots, sandals, slippers, and the like), jewelry (e.g., rings, necklaces, bracelets, earrings, broaches, and the like), accessories (e.g., handbags, purses, backpacks, electronic device carriers, and the like), or other customizable wearable goods. Although described herein as applying to apparel design, in other implementations, the system 100 may be configured to perform automated design for other design domains, such as design of virtual apparel or appearance (e.g., "skins") for avatars, video game characters, VR or AR models or characters, other virtual models or characters, design of print media or digital media, design of other customizable goods, and the like.

As shown in FIG. 1, the system 100 includes a user device 102, a server 120, one or more networks 160, and a database 170. The user device 102 may include or correspond to a smartphone, a tablet computing device, a personal computing device, a laptop computing device, a computer system of a vehicle, a personal digital assistant (PDA), a smart watch, another type of wireless computing device, a desktop computer, an entertainment system, or any part thereof. The user device 102 includes one or more processors 104, a memory 106, one or more communication interfaces 110, a microphone 112, and a camera 114. The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the user device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the user device 102 may be stored in the memory 106 as instructions 108 that, when executed by the one or more processors 104, cause the one or more processors 104 to perform the operations described herein with respect to the user device 102, as described in more detail below.

The one or more communication interfaces 110 may be configured to communicatively couple the user device 102 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). In some implementations, the user device 102 includes one or more input/output (I/O) devices that include one or more display devices, a keyboard, a stylus, one or more touchscreens, a mouse, a trackpad, the microphone 112, the camera 114, one or more speakers, haptic feedback devices, or other types of devices that enable a user to receive information from or provide information to the user device 102. The microphone 112 may be configured to capture one or more audio signals, such as audio signals representing speech from the user. The camera 114 may be configured to capture one or more images (e.g., static images, video, and the like).

The server 120 includes one or more processors 122, a memory 124, one or more communication interfaces 130, a speech-to-text converter 132, a natural language processor 134, a design generation engine 136, a virtual changing room manager 140, a gesture detector 142, an emotion recognizer 144, a social media analyzer 146, and a recommendation engine 148. It is noted that functionalities described with reference to the server 120 is provided for purposes of illustration, rather than by way of limitation and that the exemplary functionalities described herein may be provided via other types of computing resource deployments. For example, in some implementations, computing resources and functionality described in connection with the server 120 may be provided in a distributed system using multiple servers or other computing devices, or in a cloud-based system using computing resources and functionality provided by a cloud-based system using computing resources and functionality provided by a cloud-based environment that is accessible over a network, such as the one of the one or more networks 160. The one or more processors 122 may include one or more microcontrollers, ASICs, FPGAs, CPUs having one or more processing cores, or other circuitry and logic configured to facilitate the operations of the server 120 in accordance with aspects of the present disclosure. The memory 124 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the server 120 may be stored in the memory 124 as instructions 126 that, when executed by the one or more processors 122, cause the one or more processors 122 to perform the operations described herein with respect to the server 120, as described in more detail below. Additionally, the memory 124 may be configured to store apparel data 128. Exemplary aspects of the apparel data 128 are described in more detail below.

The one or more communication interfaces 130 may be configured to communicatively couple the server 120 to the one or more networks 160 via wired or wireless communication links established according to one or more communication protocols or standards (e.g., an Ethernet protocol, a TCP/IP, an IEEE 802.11 protocol, and an IEEE 802.16 protocol, a 3G communication standard, a 4G/LTE communication standard, a 5G communication standard, and the like). In some implementations, the server 120 includes one or more I/O devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 120.

The speech-to-text converter 132 may be configured to perform operations to convert input audio data that represents user speech into text data. For example, the speech-to-text converter 132 may generate text data based on audio data received from the user device 102. In some implementations, the speech-to-text converter 132 may be configured to convert a received audio file into bits, digitally sample the converted audio file to generate sampled sound data, perform pre-processing on the sampled sound data to generate processed sound data, and perform character recognition on the processed sound data to recognize characters for use in generating the text data. In some such implementations, the speech-to-text converter 132 may be configured to perform the character recognition using one or more machine learning (ML) models, such as a recurrent neural network (RNN), as a non-limiting example. In some other implementations, instead of performing on-device speech-to-text conversion, the server 120 may be configured to provide the input audio data to another device (e.g., a cloud-based device) via the one or more networks 160 for performing the speech-to-text conversion, and the server 120 may receive text data resulting from the speech-to-text conversion from the other device.

The natural language processor 134 may be configured to perform operations for performing NLP on text data to interpret user instructions represented by the text data. The text data may include input text data received from the user device 102 or text data generated by the speech-to-text converter 132. The natural language processor 134 may be configured to perform one or more NLP operations on the text data to analyze, format, process, and detect elements within the text data to interpret the user instructions represented by the text data. In some implementations, the natural language processor 134 may be configured to perform phrase vectorization on the text data to generate one or more vectors of embeddings. Phrase vectorization may be a feature learning technique that is low-dimensional and learns continuous vector representations of the text data which can be translated into one or more higher dimension vectors. In the case of word vectorization, dense vectors of words may be mapped to a lower-dimensional vector space. Vectorization may capture the semantics of the words or phrases by placing semantically similar words or phrases close to each other inside an embedding space. Vectorization may be performed using one or more ML models. For example, a ML model for vectorization may be trained by the natural language processor 134, or the natural language processor 134 may include or have access to one or more pre-trained ML models. One basic type of vectorization that may be performed using the ML models is a process of token embedding, which converts each token in the text data to a vector format. Another type of vectorization is a process of sentence embedding, which converts sentences to numerical classes to separate one sentence from another sentence. Another type of vectorization is a process of transformer positional embeddings, which indicates positions of each word in the sequence of words of the text data. In some implementations, the natural language processor 134 may be configured to use a multilayer bi-directional transformer-encoder to perform the phrase vectorization. The transformer of the multilayer bi-directional transformer-encoder may include or correspond to a neural network that uses parallel attention layers. The multilayer bi-directional transformer-encoder may be pre-trained on two unsupervised learning tasks: (1) a "masked language prediction task (or model)" that includes randomly masking (e.g., replacing with a "MASK" token) a particular amount of the tokens, such as 15%, and training the model to predict the masked tokens; and (2) a "next sentence prediction" task that includes providing the model with a pair of sentences and training the model to identify when the second sentence follows the first sentence in the sequence of the text data. This second task may be designed to capture more long-term or pragmatic information from the text data. Although described above as performing phrase vectorization, in other implementations, the natural language processor 134 may be configured to perform tokenization, stemming, lemmatization, word vectorization, sentence vectorization, or other types of vectorization.

In some implementations, the natural language processor 134 may be configured to perform named entity recognition (NER) on the one or more vectors to identify particular terms. To illustrate, the phrases of the text data may include particular terms that represent specific entities that contain the information of the user instructions with respect to the type of apparel design requested by the user. The specific entities bay be referred to as named entities, and the named entities may represent visual design elements such as types of designs, sketches, logos, and the like. To perform NER, the natural language processor 134 may be configured to select one or more pre-trained embeddings, filter an embeddings vocabulary associated with the pre-trained embeddings to select context-sensitive words or phrases, and generate context-independent signatures from the embeddings vocabulary. Generating the context-independent signatures may include iterating through all words or phrases of the embeddings vocabulary, selecting the context-independent signature for each term that satisfies a threshold and treating the selected term in the trail of a word as a complete graph where edge strengths correspond to distance values, and selecting a node having the maximum strength of all the nodes. Once a term is selected as part of a context-independent signature, the term is not considered for pivot candidate evaluation. To perform NER, the natural language processor 134 may further be configured to pre-process a sentence using a minimum number of steps, perform phrase span identification on the sentence, use embeddings to predict each position in the sentence, determine a match between context sensitive and context independence, and evaluate the NER. As a particular example, if the text data includes "zig zag bottom blue t-shirt for Earth Day," the context-sensitive words "zig," "zag," "bottom," "blue," "t-shirt," "Earth," and "Day" may be selected, context strengths from the embedding may be determined, phrase spans may be identified based on the context strengths to identify the phrases "zig zag bottom," "blue t-shirt," and "Earth Day," context sensitive and context independent identification may be performed on the phrases, and NER may be performed/evaluated to identify the named entities "zig zag bottom" and "Earth Day" as corresponding to design elements, and the named entity "blue t-shirt" as corresponding to apparel base/content. In some implementations, the NER may identify not only categories (e.g., design elements and apparel base/content), but sub-categories as well (e.g., image design elements, text design elements, pattern design elements, color design elements, apparel color, apparel type, apparel size, and the like).

The design generation engine 136 may be configured to perform operations to generate an apparel design, or multiple apparel designs, based on the user instructions represented by the input text data received from the user device 102 (or the text data generated by the speech-to-text converter 132). For example, the design generation engine 136 may be configured to receive an output from the natural language processor 134 (e.g., one or more vectors, indication of recognized named entities, or a combination thereof), and to generate the apparel design based on the output. The apparel design may include various aspects or parameters, such as apparel type, apparel size, apparel color, location of one or more visual design elements on the apparel, characteristics of the one or more visual design elements (e.g., sizes, colors, patterns, images, text, and the like), and the like. As a particular example, if the user instructions include "a red long-sleeved shirt having a yellow zig zag pattern at the neck", the apparel design may indicate a visual representation of a red shirt having long sleeves and that includes a yellow zig zag pattern that surrounds the neck of the red shirt. The design generation engine 136 may be configured to generate the apparel design in real-time/substantially real-time, such as a substantially imperceptible amount of time after the user provides the user instructions to the user device 102. As non-limiting examples, the design generation engine 136 may be configured to generate the apparel design immediately/nearly immediately, such as within a few microseconds, a few milliseconds, or a few seconds, of the user providing the user instructions to the user device 102.

To generate the apparel design, the design generation engine 136 may be configured to perform deep learning using ML models 138, which may be included in or accessible to (e.g., via storage at the memory 124) the design generation engine 136. For example, the ML models 138 may be configured to receive the output of the natural language processor 134 (or an output of one of the ML models 138) and to generate an output that indicates the apparel design (or an intermediate output that is used as input to another of the ML models 138 as part of the process of generating the apparel design). In some implementations, the ML models 138 include or correspond to one or more neural networks, such as recurrent neural networks, convolutional neural networks, deep neural networks, or other types of neural networks. In other implementations, the ML models 138 may include or correspond to other types of ML models or constructs, such as support vector machines (SVMs), decision trees, random forests, regression models, and the like.

In some implementations, the ML models 138 include at least a first ML model and a second ML model. The first ML model may be configured to generate outputs that indicate one or more visual design elements (and/or one or more apparel contents) based on the output of the natural language processor 134 (e.g., one or more vectors, indication of recognized named entities, or a combination thereof), and the second ML model may be configured to generate the apparel design based on the one or more visual design elements (and/or the one or more apparel contents). In some implementations, the first ML model may include or correspond to multiple generative adversarial networks (GANs) configured to identify the one or more visual apparel design elements represented by the user instructions, as further described with reference to FIG. 3, and the second ML model may include or correspond to a convolutional neural network configured to determine the apparel design based on the one or more visual apparel design elements and one or more cost functions, as further described with reference to FIG. 2. In some other implementations, the ML models 138 may include a single ML models or more than two ML models.

In some implementations, the server 120 may be configured to train the ML models 138 using training data, prior to receiving user instructions and determining apparel designs. In some implementations, the server 120 may be configured to train the ML models 138 using training data 172 stored at a database 170 that is accessible to the server 120 via the one or more networks 160. Alternatively, the training data 172 may be generated at or stored at the server 120, such as in the memory 124 or an internal database of the server 120. The training data 172 may include training data for each of the ML models 138. For example, the training data 172 may include data indicating labeled vectors (e.g., phrase vectors) or named entities (e.g., labeled based on corresponding visual apparel design elements), images of real apparel design elements, images of fake apparel design elements (or improperly labeled images), cost function values, loss values, other information, or a combination thereof. Additional details for training data for the ML models 138, and for other ML models used by the server 120, are described below, and are included in the training data 172. Alternatively, one or more of the ML models 138 may be pre-trained. For example, the server 120 may receive ML model parameters from another device that is configured to train ML models, and the server 120 may initially configure the ML models 138 based on the ML model parameters. Additionally or alternatively, the server 120 may periodically or continuously receive or generate the apparel data 128, which may include image data of new apparel styles, new design styles, or a combination thereof. For example, the apparel data 128 may be entered by a human operator at the server 120 (or a terminal device communicatively coupled to the server 120) when images of new apparel or new designs are obtained by the human operator. Additionally or alternatively, the server 120 may be configured to automatically obtain the apparel data 128, such as by accessing apparel and design image databases or executing a web-crawler, as illustrative examples.

The virtual changing room manager 140 may be configured to perform operations to initiate display of a virtual scene, also referred to as a "virtual changing room," at the user device 102. The virtual scene may include a visual representation of the user wearing a representation of apparel (e.g., virtual apparel) having the apparel design generated by the design generation engine 136. For example, the virtual changing room manager 140 may be configured to generate visual data (e.g., image data or video data) representing the virtual changing room, and the server 120 may be configured to transmit the visual data to the user device 102 for display via a display device of the user device 102. In some implementations, the display device of the user device 102 may include or correspond to a monitor or touchscreen that is integrated within or coupled to the user device 102, a virtual reality (VR) display that is integrated within or coupled to the user device 102, an augmented reality (AR) display that is integrated within or coupled to the user device 102, another type of display device, or a combination thereof.

In some implementations, the virtual changing room manager 140 may be configured to generate the visual data based at least in part on image data (or video data) received from the user device 102. For example, the server 120 may receive image data from the user device 102 that is captured by the camera 114 and that includes images of the user, and the virtual changing room manager 140 may be configured to modify the image data by adding a virtual model (e.g., a representation) of apparel worn by the user and having the apparel design to generate the visual data. In some implementations, the virtual changing room manager 140 may be configured to modify the virtual model of the apparel based on changes associated with the user as represented by the image data. As non-limiting examples, the virtual changing room manager 140 may be configured to rotate the virtual model of the apparel if the user rotates their orientation or to scale the virtual model of the apparel if the user moves closer to or further from the camera 114. In some implementations, the virtual changing room manager 140 may be configured to use one or more ML models to generate the visual data. For example, the virtual changing room manager 140 may be configured to provide the image data from the user device 102 and data indicating the apparel design generated by the design generation engine 136 as inputs to one or more ML models, such as a neural style transfer network, that is configured to combine the image data and the apparel design while reducing one or more loss functions to generate the visual data, in a similar manner to the description below with reference to FIG. 4.

In some implementations, the virtual changing room manager 140 may be configured to support one or more controls at the user device 102 with respect to the virtual changing room. For example, the virtual changing room manager 140 may be configured to support an approval or selection control (e.g., for approving the apparel design), a disapproval or rejection control (e.g., for rejecting the apparel design), one or more change apparel controls (e.g., a display next apparel design control and/or a display previous apparel design control), an update apparel design control, other controls, or a combination thereof. The virtual changing room manager 140 may be configured to perform one or more operations based on detection of selected controls, such as setting a flag associated with an approved apparel design, discarding data indicating a rejected apparel design, or changing the virtual model of the apparel based on selection of a change apparel control, as non-limiting examples.

The virtual changing room manager 140 may detect user selection of controls using a variety of techniques. In some implementations, the user may enter text indicating selected controls at the user device 102, and the user device 102 transmits text data to the server 120. The natural language processor 134 may be configured to perform one or more NLP operations on the text data to interpret the selected controls, as described above, and the virtual changing room manager 140 may be configured to identify the selected controls based on the output of the natural language processor 134 and to perform one or more operations based on the selected controls. Additionally or alternatively, the user may speak one or more controls for the virtual changing room, and the user device 102 transmits audio data captured by the microphone 112 to the server 120. The speech-to-text converter 132 may be configured to convert the audio data to text data, as described above, for processing by the natural language processor 134 and identification of the selected controls. In some other implementations, the server 120 may include a speech recognizer configured to recognize the selected controls based on the audio data. For example, the speech recognizer may be configured to label sounds included in the audio data, pre-process the audio data, perform feature extraction on the audio data to generate audio features, provide the audio features to an attention model (e.g., a ML model), and to capture sound bits of the audio data based on the output of the attention model to recognize the selected controls.

Additionally or alternatively, the user may perform one or more gestures to indicate selected controls, and the user device 102 transmits image data captured by the camera 114 to the server 120. For example, the gestures may include an "okay" gesture or a "thumbs up" gesture indicating approval of the apparel design, a "thumbs down" gesture indicating rejection of the apparel design, a "snap" gesture, a "palm opening" or "palm closing" gesture, or a "hand wave" gesture indicating a change apparel control, a "clap" gesture indicating an update apparel design control, or other gestures indicating the selected controls. The gesture detector 142 may be configured to receive the image data from the user device 102 and to detect the selected controls based on the image data, and the virtual changing room manager 140 may be configured to perform one or more operations based on the output of the gesture detector 142. For example, the gesture detector 142 may be configured to perform one or more gesture detection and/or gesture recognition operations on the image data. In some implementations, the gesture detector 142 may be configured to perform the gesture detection using one or more ML models. For example, the gesture detector 142 may be configured to provide the image data as input to a convolutional neural network configured to output labels of gestures included in the image data. In some implementations, the convolutional neural network, or other ML model, may be trained using training data that includes features extracted from pre-processed image data corresponding to labeled hand gestures.

The emotion recognizer 144 may be configured to determine user emotions or user sentiments associated with the apparel design generated by the design generation engine 136. For example, the emotions may include happiness, sadness, indifference, surprise, disappointment, frustration, or other emotions, and the emotions may each be associated with a score or rating indicating the user sentiment. To illustrate, happiness and surprise may be associated with a relatively high score or a positive rating, indifference may be associated with a medium score or a neutral rating, and sadness, disappointment, and frustration may be associated with a relatively low score or a negative rating. In some implementations, the emotion recognizer 144 may be configured to detect user emotions based on data received with respect to display of the virtual changing room. To illustrate, the emotion recognizer 144 may be configured to detect the user emotions based on the image data received from the user device 102 responsive to display of the virtual changing room at the user device 102. For example, the emotion recognizer 144 may be configured to perform facial state detection and recognition based on the image data. In some implementations, the emotion recognizer 144 may be configured to perform the facial state detection using one or more ML models. For example, the one or more ML models may be configured to receive the image data that includes the user's face and to generate an output that indicates a label of the facial state (e.g., smiling, frowning, confused, neutral, etc.) of the user's face in the image data. In some implementations, the one or more ML models may include a convolutional neural network. The one or more ML models may be trained based on features extracted from labeled facial state images (optionally after pre-processing of the images). As another example, the emotion recognizer 144 may be configured to detect the user emotions based on the audio data received from the user device 102 responsive to display of the virtual changing room at the user device 102. For example, the emotion recognizer 144 may be configured to perform audio level or audio state detection based on the audio data that represents user speech. In some implementations, the emotion recognizer 144 may be configured to perform the audio level or audio state detection using one or more ML models. For example, the one or more ML models may be configured to receive the audio data that represents the user speech and to generate an output that indicates a label of the audio level (or other audio state) associated with the user speech. The audio level may include or correspond to audio levels, audio frequencies, spectral energies, or the like. In some implementations, the one or more ML models may include a convolutional neural network. The one or more ML models may be trained based on features extracted from labeled audio spectrograms (or other audio data, optionally after pre-processing the audio spectrograms or other audio data). In some implementations, the output of the one or more ML models configured to identify the facial states and the output of the one or more ML models configured to identify the audio levels are both provided as input to an additional ML model configured to identify the user emotions based on the facial states and the audio levels. In some implementations, the additional ML model may include or correspond to a fusion network (e.g., a neural network) that includes multiple fully connected layers. Additionally or alternatively, the emotion recognizer 144 may be configured to determine the user emotions (or the corresponding sentiment score or rating) based on the selected controls. For example, the emotion recognizer 144 may be configured to map a selected control to a particular emotion, sentiment score, or sentiment rating. As particular, non-limiting examples, the emotion recognizer 144 may be configured to map acceptance of the apparel design to a relatively high score or positive rating, rejection of the apparel design to a relatively low score or negative rating, or a change apparel control to a neutral or low score or a neutral or negative rating. The emotion recognizer 144 may be configured to aggregate any of the detected emotions or user sentiments described above to determine an overall user sentiment score or rating associated with the apparel design.

The emotion recognizer 144 may be configured to provide the user sentiment scores or ratings as feedback data to the design generation engine 136 for training one or more of the ML models 138. For example, the design generation engine 136 may train the first ML model, the second ML model, any others of the ML models 138, or a combination thereof, based on training data that indicates the output of the natural language processor 134, labels associated with the outputs generated by the ML models 138, and a reward value or reward probability based on the user sentiment score or rating received from the emotion recognizer 144, as further described herein with reference to FIG. 2. Training the ML models 138 in this fashion may tune parameters associated with the ML models 138. As illustrative examples, if the first ML model of the ML models 138 includes or corresponds to a neural network, training the first ML model may include tuning (e.g., modifying) a number of nodes included in one or more layers of the first ML model, adding or removing a connector between nodes, tuning a weight associated with a connector, tuning a function associated with a node, adding or removing a layer of the first ML model, tuning a hyper parameter, or a combination thereof.

The social media analyzer 146 may be configured to perform operations to generate and/or share the apparel design generated by the design generation engine 136 via social media and to determine public sentiment associated with the apparel design based on social media activity. For example, the social media analyzer 146 may be configured to generate a social media message (e.g., a "post") that indicates the apparel design, and the social media analyzer 146 may be configured to distribute the social media message to one or more social media networks. The social media message may include embedded image or video data that displays the apparel design, such as the output of the virtual changing room manager 140, or may include a link to a website or other location where such imaged data or video data is hosted. The social media networks may include any type of social media network, such as Facebook®, Instagram®, Twitter®, Pinterest®, YouTube®, TikTok®, Snapchat®, and the like. Although the techniques are described below in the context of social media networks, the social media analyzer 146 may be configured to perform similar operations video calling or teleconferencing applications.

In some implementations, the social media analyzer 146 may be configured to distribute the social media message to social media networks for which the user is registered. For example, the social media analyzer 146 may be configured to receive an indication of selected social media networks and credential data (e.g., user logins, passwords, and the like) from the user device 102 and to distribute the social media message to selected social media networks using the credential data. In some implementations, the credential data may be securely stored at the server 120 temporarily, and may be discarded after completion of a public sentiment determination process. In some other implementations, the social media message may be transmitted to the user device 102 for distribution to the selected social media networks by the user device 102, such as via websites or social media applications executed at the user device 102. The social media message may be distributed privately (e.g., to members included in contact lists of the user) or publically (e.g., to all members of the selected social media networks). Additionally or alternatively, the social media analyzer 146 may be configured to distribute the social media message to social media networks for which an operator of the server 120 is registered.

The social media analyzer 146 may be configured to, after distribution of the social media message to the social media networks, receive social media data from the social media networks and analyze the social media data to determine public sentiment associated with the apparel design generated by the design generation engine 136. The social media data may indicate reply messages and comments, emotional response indicators (e.g., "likes" or other indicators of emotional responses), sharing or re-distribution of the social media message, and the like. The social media analyzer 146 may be configured to analyze the social media data to determine sentiment indicators associated with the social media data. As illustrative examples, the sentiment indicators may include a number of reply messages or comments to the social media message, a number of "likes" (or other indicators of emotional responses), a number of shares or retransmissions of the social media message, and particular keywords included in reply messages or comments (e.g., "like," "love," "good," "great," "nice," "pretty," "wow," "fashionable," "meh," "okay," "bad," "hate," "ugly," etc.).

The social media analyzer 146 may be configured to determine a sentiment score or rating for each social network based on the sentiment indicators associated with the respective social network, such as by mapping the sentiment indicators to scores or ratings and averaging the scores or ratings for the respective social network. As illustrative examples, a number of replies that satisfies a first threshold may be mapped to a relatively high score or a positive rating, a number of replies that fails to satisfy the first threshold but that satisfies a second threshold may be mapped to a relatively mid score or a neutral rating, a "like" may be mapped to a relatively high score or a positive rating, and various keywords may be mapped to scores or ratings associated with the sentiment indicated by the respective keyword. The social media analyzer 146 may be configured to determine a public sentiment score or rating associated with the apparel design by aggregating the sentiment scores or ratings for all of the social networks. The social media analyzer 146 may also be configured to provide the public sentiment score or rating as feedback data to the design generation engine 136 for training one or more of the ML models 138, similar to as described above for the user sentiment score or rating generated by the emotion recognizer 144.

The recommendation engine 148 may be configured to perform operations to improve the apparel design process based on data associated with similar users. For example, the recommendation engine 148 may be configured to recommend additional apparel designs, add additional visual design elements or apparel characteristics during the apparel design process, tune parameters of the ML models 138, or a combination thereof, based on the data associated with similar users. To illustrate, the recommendation engine 148 may be configured to maintain user profiles associated with each user. The user profiles may include historical purchase information for the respective user, historical user sentiment scores or ratings, historical public sentiment scores or ratings, historical apparel designs associated with positive sentiment scores or ratings, historical ML model parameter values, other information, or a combination thereof. In some implementations, the recommendation engine 148 may be configured to generate vectors that include historical purchases and user sentiment distributions for each user, group users having similar vector value patterns into groups, and generate a matrix of user and vector values for the groups. The recommendation engine 148 may also be configured to generate a vector for an active user (e.g., the user associated with user device 102) and perform classification, such as using a K-nearest neighbor algorithm, on the vector for the active user with the matrix of user and vector values to predict the group associated with the active user. After the group is identified, the recommendation engine 148 may be configured to perform operations based on user profiles for other members of the group, such as providing recommendations for apparel associated with historical purchases of the other group members, adding additional visual design elements or apparel characteristics associated with historical designs associated with positive scores or ratings for the other group members as inputs to one or more of the ML models 138, or tuning parameters of the ML models 138 based on historical ML model parameters for the other group members. In this manner, the recommendation engine 148 may be configured to facilitate user-collaborative filtering for providing recommendations or generating apparel designs, which may result in apparel designs that are more likely to appeal to the user.

During operation of the system 100, the user of the user device 102 may input one or more user instructions for designing apparel using the user device 102. For example, the user may speak the user instructions into the microphone 112 or the user may enter text representing the user instructions using an I/O device of the user device 102. The user device 102 may generate input data representing the user instructions, and the user device 102 may transmit the input data to the server 120 via the one or more networks 160. The server 120 may receive the input data and extract the user instructions from the input data. If the input data includes audio data, the speech-to-text converter 132 may perform speech-to-text conversion to generate text data based on the audio data. In some implementations, extracting the user instructions may include performing pre-processing or other operations on the text data (e.g., the text data received from the user device 102 or generated by the speech-to-text converter 132) to remove excess spaces, unidentified words or erroneous characters, remove punctuation, and the like.

After optional speech-to-text conversion and pre-processing, the natural language processor 134 may perform NLP on the text data (e.g., the extracted user instructions) to generate processed instruction data. In some implementations, the NLP may include vectorization and NER, and the processed instruction data may include phrase vectors (or other vectors) and/or recognized named entities. In some implementations, the natural language processor 134 may be configured to identify a language associated with the text data and to perform specific NLP for the respective language, thereby enabling the system 100 to support multiple languages for communicating with the user device 102. After generation of the processed instruction data, the design generation engine 136 may generate an apparel design based on the processed instruction data. The design generation engine 136 may generate the apparel design in real-time/ substantially real-time, based on processing speed of the design generation engine 136 and/or the one or more processors 122. The design generation engine 136 may generate the apparel design using the ML models 138. In some implementations, generating the apparel design may include providing the processed instruction data (e.g., the vectors and/or the recognized named entities) to the first ML model of the ML models 138 to select one or more visual design elements (and/or one or more apparel descriptions), and providing the one or more visual design elements (and/or the one or more apparel descriptions) as input to the second ML model of the ML models 138 to determine the apparel design.

In some implementations, after generating the apparel design, the virtual changing room manager 140 may cause display of a virtual changing room at the user device 102. For example, the virtual changing room manager 140 may generate visual data for transmission to the user device 102 that causes display of a virtual scene that includes a visual representation of the user wearing a representation of apparel (e.g., virtual apparel) having the apparel design generated by the design generation engine 136. In some implementations, the visual representation of the user may be based on image data captured by the camera 114 of the user device 102, and the virtual apparel may be a computer generated version of physical apparel. In some other implementations, the visual representation of the user may be an avatar created by or selected by the user, and the apparel design may be for virtual apparel for the avatar, such as for use in a video game, a chat application, a teleconference application, and the like. The virtual changing room manager 140 may support multiple controls and may modify display of the virtual changing room, such as accepting the apparel design or displaying another apparel design, based on controls selected by the user using the user device 102. In some implementations, the user may perform gestures to indicate the selected controls, and the gesture detector 142 may process image data received from the user device 102 to identify the selected controls. In some other implementations, the user may speak to indicate the selected controls, and the speech-to-text converter 132 and the natural language processor 134 may be used to interpret the selected controls, similar to as described above for the user instructions.

In some implementations, the emotion recognizer 144 may detect user emotions associated with the apparel design and generate user sentiment scores or ratings based on the detected emotions. For example, the emotion recognizer 144 may perform facial state recognition on the image data received from the user device 102 (e.g., the image data used to generate the virtual representation of the user in the virtual changing room and/or to provide gestures for controlling the virtual changing room) to detect the user emotion associated with the apparel design. Additionally or alternatively, the emotion recognizer 144 may perform audio level or audio state detection on the audio data received from the user device 102 (e.g., the audio data representing the speech that indicates the selected controls for the virtual changing room) to detect the user emotion associated with the apparel design. Additionally or alternatively, the emotion recognizer 144 may map the selected controls for the virtual changing rooms to the user emotion associated with the apparel design. The emotion recognizer 144 may determine user sentiment scores or ratings based on any or all of the above-described user emotions, and the user sentiment scores or ratings may be provided to the design generation engine 136 for use in generating training data for training the ML models 138.

In some implementations, the social media analyzer 146 may generate a social media message that indicates the apparel design generated by the design generation engine 136, and the social media analyzer 146 may distribute the social media message to one or more social media networks. The social media networks may include social media networks for which the user of the user device 102 is registered, social media networks for which the operator of the server 120 is registered, publicly available social media networks, or a combination thereof. The social media analyzer 146 may also obtain social media data from the social media networks based on distribution of the social media message to the social media networks. The social media data may indicate reply messages or comments, "likes" or other emotion indicators, shares or retransmissions of the social media message, and the like. The social media analyzer 146 may determine a public sentiment score or rating based on the social media data, such as by determining sentiment scores or ratings based on sentiment indicators (e.g., the number of reply messages or comments, the emotional indicators, the number of shares or retransmissions of the social media message, the number of views of the social media message, keywords included in the reply messages or comments, and the like) for each social media network and aggregating the sentiment scores or ratings of all the social media networks. The public sentiment score or rating may be provided to the design generation engine 136 for use in generating training data for training the ML models 138.

In some implementations, the recommendation engine 148 may recommend additional apparel designs, add additional visual design elements or apparel descriptions to the apparel design process, tune parameters of the ML models 138, or a combination thereof, based on user profiles of users that are similar to the active user (e.g., the user of the user device 102). For example, the recommendation engine 148 may predict a user group to which the active user is a member by comparing a vector based on the profile of the active user to vectors associated with multiple user groups. The recommendation engine 148 may recommend the additional apparel designs, add the additional design elements or apparel descriptions, and/or tune the parameters of the ML models 138 based on historical purchase data, historical apparel designs associated with high user sentiments, and/or historical ML model parameters, respectively, indicated by one or more user profiles of the predicted user group.

In some implementations, the design generation engine 136 and the virtual changing room manager 140 may operate to refine the apparel design process until generation of an apparel design associated with a user sentiment score or rating that satisfies a threshold. To illustrate, after display of the apparel design by the virtual changing room manager 140, the design generation engine 136 may further train the ML models 138 using feedback data that is generated at least in part on user sentiment scores or ratings from the emotion recognizer 144, public sentiment scores or ratings from the social media analyzer 146, ML parameter values from the recommendation engine 148, or a combination thereof. Such training of the ML models 138 may result in the design generation engine 136 being able to generate additional apparel designs associated with higher user sentiment scores or ratings than previous apparel designs. After the training, the design generation engine 136 may generate additional apparel designs, and the additional apparel designs may be displayed in the virtual changing room at the user device 102 by the virtual changing room manager 140. This process of training the ML models 138, generating additional apparel designs, and displaying the additional apparel designs within the virtual changing room may continue until at least one apparel design is determined to be associated with a user sentiment score or rating that satisfies a threshold. In this manner, the design generation engine 136 may continuously refine apparel designs based on user sentiment (and/or public sentiment or similar user information) until generation of an apparel design that satisfies the expectations of the user.

After generation of an approved apparel design, the server 120 may perform one or more operations based on the apparel design. As an example, the server 120 may transmit data indicating the apparel design to the user device 102 via the one or more networks 160 for display and/or storage at the user device 102. As another example, the server 120 may store the data indicating the apparel design at the memory 124 of the server 120 (or in an internal or external database). As another example, the server 120 (e.g., the recommendation engine 148) may generate or update a user profile for the user based on the apparel design. As yet another example, the server 120 may initiate a transaction associated with the apparel design, such as an online purchase of apparel having the apparel design. The above-described operations are illustrative, and in other implementations, the server 120 may perform other operations based on the apparel design.

As described above, the system 100 provides automated apparel design based on user instructions in real-time/substantially real-time, such as by generating apparel designs using the design generation engine 136. Automating the apparel design process may substantially reduce (or eliminate) the activity of a human designer in the apparel design process. Additionally, by using the speech-to-text converter 132 and the natural language processor 134 to interpret user instructions, the system 100 permits the user to provide instructions verbally or in text in a more "natural" manner, as compared to selecting from multiple predetermined options, which may improve user friendliness of the system 100 and increase user satisfaction. Enabling the user to provide the user instructions and to view the apparel designs via the virtual changing room involves the user in the design process, which may result in apparel designs associated with increased user satisfaction and decreased likelihood or returns or refund requests. By leveraging deep learning, such as by training and using the ML models 138 in the apparel design process, the system 100 may generate apparel designs that continue to adapt to changing trends and local, regional, and national preferences, which would otherwise require significant research and activity by a human designer. This adaption in designing may be particularly beneficial for successfully targeting growing markets, such as young customers and emerging marketplaces, which may have significant expectations for apparel designs. Additionally, by training the ML models 138 based on user sentiments, public sentiments, and other updated information, the system 100 may continually refine apparel designs in order to achieve high user satisfaction and match the user's expectations, thereby increasing the likelihood of the user purchasing apparel and recommending the service to others.

Figure 2:
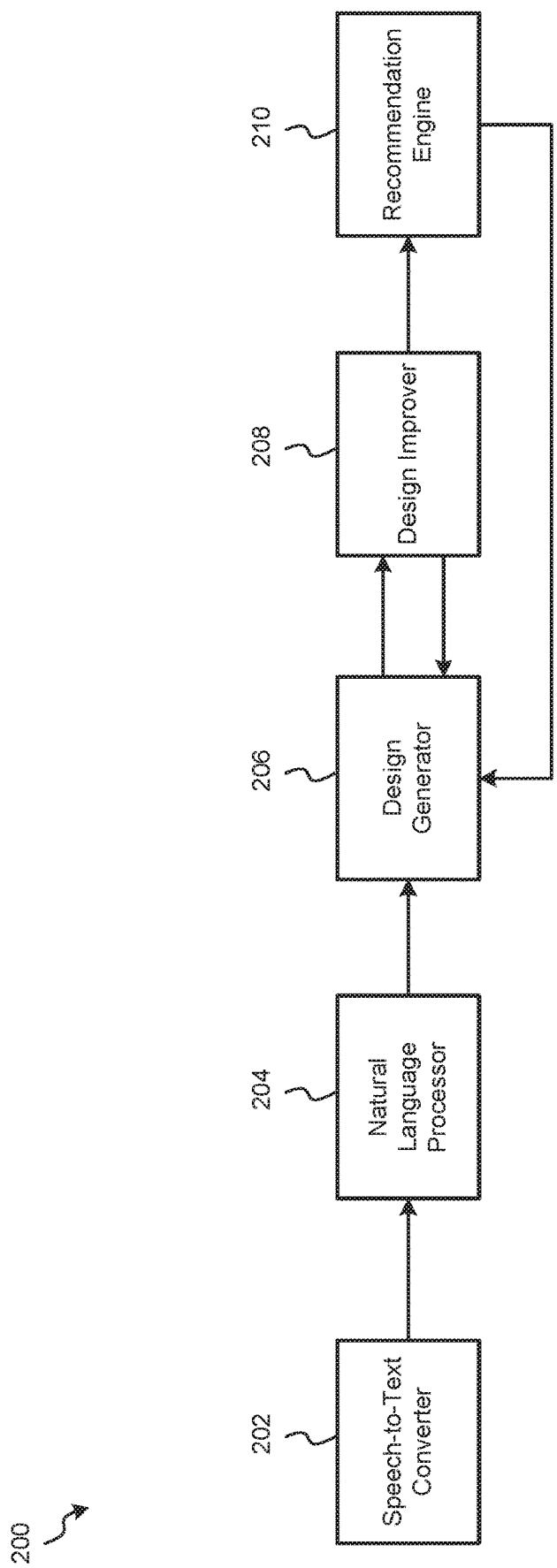
FIG. 2 is a block diagram of an example of an automated apparel design system according to aspects of the present disclosure.

Referring to FIG. 2, an example of an automated apparel design system according to aspects of the present disclosure is shown as a system 200. The system 200 may be configured to receive input data that indicates user instructions for apparel design from another device, such as the user device 102 of FIG. 1, and to generate an apparel design based on the user instructions. Generation of the apparel design may be automated and performed in real-time/substantially real-time. In some implementations, the system 200 may include or correspond to one or more components of the server 120 of FIG. 1. As shown in FIG. 2, the system 200 may include a speech-to-text converter 202, a natural language processor 204 coupled to the speech-to-text converter 202, a design generator 206 coupled to the natural language processor 204, a design improver 208 coupled to the design generator 206, and a recommendation engine 210 coupled to the design improver 208 and to the design generator 206.

The speech-to-text converter 202 may be configured to perform operations to convert the input data to speech data if the input data is audio data representing user speech. In some implementations, the speech-to-text converter 202 may include or correspond to the speech-to-text converter 132 of FIG. 1. To illustrate, the speech-to-text converter 202 may be configured to analyze the audio data to recognize particular sounds and to convert the sounds to characters of text. In some implementations, the speech-to-text converter 202 may be configured to convert a received audio file into bits, digitally sample the converted audio file to generate sampled sound data, perform pre-processing on the sampled sound data to generate processed sound data, and perform character recognition on the processed sound data to recognize characters for use in generating the text data. In some such implementations, the speech-to-text converter 202 may be configured to perform the character recognition using one or more trained ML models, such as a recurrent neural network (RNN) or a time delay neural network (TDNN), as non-limiting examples. In some other implementations, the system 200 does not include the speech-to-text converter 202, and the audio data is provided to another device (e.g., a cloud-based device) for performing the speech-to-text conversion, and the resulting text data is received by the system 200. Alternatively, if the input data is text data, the input data may be provided directly to the natural language processor 204 (and the speech-to-text converter 202 may not be used).

The natural language processor 204 may be configured to perform NLP operations on the text data (either received as the input data or from the speech-to-text converter 202) to interpret the user instructions represented by the text data. In some implementations, the natural language processor 204 may include or correspond to the natural language processor 134 of FIG. 1. To illustrate, the natural language processor 204 may be configured to perform one or more NLP operations on the text data to analyze, format, process, and detect elements within the text data to interpret the user instructions represented by the text data. In some implementations, the natural language processor 204 may be configured to perform phrase vectorization on the text data to generate one or more vectors of embeddings, and to perform named entity recognition (NER) on the one or more vectors to identify particular terms, as described with reference to FIG. 1. The phrase vectorization and the NER may be performed using one or more trained ML models, such as a bi-directional transformer-encoder network, a supervised classifier, or a semi-supervised classifier, as illustrative examples. Additionally or alternatively, the natural language processor 204 may be configured to perform other NLP operations on the text data, such as lemmatization, morphological segmentation, speech tagging, parsing, stemming, word segmentation, and the like.

The design generator 206 may be configured to perform operations to generate an apparel design based on the output of the natural language processor 204 (e.g., the phrase vectors, the recognized named entities, and/or other processed text data). In some implementations, the design generator 206 may include or correspond to the design generation engine 136 of FIG. 1. The design generator 206 may generate the apparel design indicating a user-selected type of apparel (e.g., shirt, pants, dress, hat, etc.) having one or more user-selected apparel features (e.g., long sleeves, cuffs, elastic waistband, size, etc.) and that includes one or more user-selected visual design elements (e.g., text, logos, images, patterns, etc.) at particular locations on the apparel, having particular sizes, orientations, etc. For example, the design generator 206 may be configured to map the named entities to an apparel type, apparel features, visual design elements, and related constraint information, and the design generator 206 may be configured to synthesize (e.g., combine) the apparel type, the apparel features, and the visual design elements according to the constraint information (e.g., location, orientation, size, etc.) to generate the apparel design.

The design generator 206 may include or have access to one or more ML models, such as neural networks, SVMs, decision trees, random forests, regression models, and the like, that are configured to perform operations of the apparel design process. The ML models may be trained using relevant training data, as further described with reference to FIG. 1, to perform the respective operations of the apparel design process. Additionally, the ML models may be further trained using training data that is based at least in part on outputs of the design improver 208 and/or the recommendation engine 210. In some implementations, the design generator 206 may be configured to use one or more general adversarial networks (GANs) to perform text to image synthesis based on the output of the natural language processor 204, similar to as described with reference to FIG. 3, and the design generator 206 may be configured to use a deep convolutional neural network to perform style transfer based on the output of the one or more GANs, similar to as described with reference to FIG. 4, to generate the apparel design.

The design improver 208 may be configured to perform operations to refine the apparel design, such as providing information to the design generator 206 to be used as training data to train the ML models to generate additional apparel designs with improved likelihood of matching user expectations. In some implementations, the design improver 208 may include or correspond to one or more of the virtual changing room manager 140, the gesture detector 142, the emotion recognizer 144, and the social media analyzer 146 of FIG. 1. To support the training of the ML models, the design improver 208 may be configured to initiate a display at the user device (e.g., the user device 102 of FIG. 1) that represents the user wearing virtual apparel having the apparel design, and, based on text data, audio data, and/or image data received responsive to the display, determine user sentiment associated with the apparel design. Additionally or alternatively, the design improver 208 may be configured to access one or more social networks to determine public sentiment associated with the apparel design. The user sentiment and/or the public sentiment may be provided to the design generator 206 for use in generating the training data for further training the ML models. Alternatively, the design improver 208 may be configured to generate reward values or reward probabilities based on the user sentiment and/or the public sentiment, and the reward values or the reward probabilities may be provided to the design generator 206 for use in generating the training data for further training the ML models.

In some implementations, the design improver 208 may be configured to initiate display of a virtual changing room at the user device, similar to as described with reference to FIG. 1. For example, the virtual changing room may include or correspond to a virtual scene that includes a representation of the user wearing a representation of apparel (e.g., virtual apparel) having the apparel design generated by the design generator 206. The representation of the user may be based on image data received from the user device, who may be positioned in front of a camera of the user device. In some implementations, the design improver 208 may include or have access to one or more ML models configured to generate visual data representing the virtual changing room. As an illustrative example, the design improver 208 may be configured to use a deep convolutional neural network to generate the visual data, in a similar manner to that described with reference to FIG. 4, except that the content image corresponds to the representation of the user (instead of the apparel content) and the style image corresponds to the virtual apparel (instead of the visual design elements).

The design improver 208 may be configured to support various controls for the virtual changing room, and the user may select one or more controls to change the virtual changing room, such as approving a selected apparel design, rejecting a selected apparel design, selecting a previously displayed apparel design, selecting a next apparel design, updating apparel designs, etc. In some implementations, the design improver 208 may be configured to perform gesture recognition, speech recognition, or a combination thereof, to identify selected controls. For example, the user may perform gestures to select one or more controls or may speak the names of one or more controls at the user device, and the design improver 208 may perform gesture recognition on image data received from the user device or perform speech recognition (e.g., speech-to-text conversion and NLP, such as by providing the audio data to the speech-to-text converter 202 and receiving processed text data/named controls from the natural language processor 204) on audio data received from the user device to identify the selected controls. In some implementations, the design improver 208 may be configured to use one or more ML models, such as a convolutional neural network, to perform the gesture recognition, and the design improver 208 may be configured to use one or more other ML models (e.g., one or more ML models used by the speech-to-text converter 202 and/or the natural language processor 204) to perform the speech recognition. Alternatively, the user may enter text at the user device, and the design improver 208 may identify selected controls in text data received from the user.

In some implementations, the design improver 208 may be configured to perform operations to detect user emotions based on data from the user device and to determine user sentiment associated with the apparel design based on the user emotions. For example, the design improver 208 may be configured to perform facial state detection on the image data received from the user device to identify facial states of the user's face while the user is viewing and/or controlling the virtual changing room, as further described with reference to FIG. 1. Additionally or alternatively, the design improver 208 may be configured to perform audio level or audio state detection on the audio data received from the user device to identify audio levels or audio states of the user's speech while the user is controlling the virtual changing room, as further described with reference to FIG. 1. In some implementations, the design improver 208 may be configured to use a first ML model, such as a convolutional neural network, to perform the facial state detection and to use a second ML model, such as another convolutional neural network, to perform the audio level or audio state detection. In some such implementations, the design improver 208 may be configured to use a third ML model, such as a fusion neural network with fully connected layers, to combine and/or analyze the facial states, the audio levels, or both, in order to determine the user emotions. Additionally or alternatively, the design improver 208 may be configured to map the selected controls for the virtual changing room to user emotions, as described further with reference to FIG. 1. After identifying/detecting the user emotions, the design improver 208 may be configured to generate a user sentiment score or rating based on the emotions, as further described with reference to FIG. 1.

In some implementations, the design improver 208 may be configured to perform operations to determine a public sentiment associated with the apparel design. For example, the design improver 208 may be configured to generate a social media message that indicates the apparel design, and the design improver 208 may be configured to distribute the social media message via one or more social media networks (e.g., social media networks for which the user is registered, social media networks for which an operator of the system 200 is registered, other publically available social media networks, or a combination thereof), as further described with reference to FIG. 1. The design improver 208 may also be configured to obtain social media data from the social media networks and to analyze the social media data to determine the public sentiment. The social media data may indicate reply messages or comments, "likes" or other emotion indicators, sharing or retransmissions of the social media message, and the like.

The design improver 208 may be configured to determine the public sentiment for the apparel design based on analyzing the social media data. For example, a particular social media network may support multiple reactions to a social media message, and the design improver 208 may be configured to count the number of each reaction and determine a sentiment (e.g., feedback) associated with the reactions, an illustrative example of which is provided in Table 1 below.

TABLE 1

| Reaction | Count | Sentiment Rating/Feedback |
| --- | --- | --- |
| Like | 10 | Positive |
| Love | 8 | Positive |
| Haha | 0 | Neutral |
| Wow | 2 | Positive |
| Sad | 0 | Negative |
| Angry | 0 | Negative |

The design improver 208 may be configured to assign a particular rating to each reaction, or to assign a particular rating if the number of each reaction satisfies a common threshold, or to assign a particular rating if the number of each reaction satisfies a reaction-specific threshold. Alternatively, the design improver 208 may be configured to assign a particular score to each reaction, and to determine the sentiment rating or score for each rating based on the number of the respective reaction and the score assigned to the respective reaction, or based on whether the number of the respective reaction satisfies a threshold. As an illustrative example, the design improver 208 may be configured to determine a sentiment score of 2 if the number of likes satisfies a first threshold, a sentiment score of 1 if the number of likes satisfies a second threshold but fails to satisfy the first threshold, a sentiment score of 0.5 if the number of likes satisfies a third threshold but fails to satisfy the second threshold, and a sentiment score of 0 if the number of likes fails to satisfy the third threshold. Each reaction may be scored using the same values and thresholds or using unique values and thresholds. Other indicators of sentiment within the social media data, such as the number of response messages or comments, the number of shares or retransmissions of the social media message, occurrences of particular keywords in the responses or comments, or the like, may be scored in a similar manner. In this manner, the design improver 208 may be configured to determine one or more sentiment ratings or scores for a first social media network. The design improver 208 may be configured to determine one or more sentiment ratings or scores for other social media networks in a similar manner, using the same values and thresholds or unique values and thresholds for the different social media networks.

In some implementations, the design improver 208 may be configured to determine a total sentiment score based on the user sentiment scores or ratings and the public sentiment scores or ratings. For example, each user sentiment rating or social media network rating may correspond to a respective sentiment score, one or more social networks may be associated with sentiment scores based on reactions, as described above, and the design improver 208 may be configured to determine the total sentiment score (e.g., a feedback score) based on a weighted sum of the various sentiment scores for user sentiments and for the social media networks. As an illustrative example, likes (or other social media reactions) from social media networks may be assigned sentiment scores based on the number of likes compared to thresholds, as described above, and sentiment ratings may be assigned sentiment scores as follows: positive=1, negative=0, and neutral=0.5. An illustrative example of determining total sentiment/feedback scores for three apparel designs based on user sentiment and social media network (SMN) sentiment is given by Table 2 below.

TABLE 2

| Apparel | User Sentiment Ratings | SMN #1 Ratings | SMN #2 Ratings | SMN #2 Reaction Scores | SMN #3 Reaction Scores | Sentiment/ Feedback Score |
| --- | --- | --- | --- | --- | --- | --- |
| Apparel #1 | Positive | Positive | Positive | 2 | 2 | 7 |
| Apparel #2 | Negative | Negative | Negative | 0 | 0 | 1 |
| Apparel #3 | Positive | Neutral | Neutral | 2 | 2 | 6 |

In some implementations, the design improver 208 may be configured to provide the user sentiment scores or ratings, the public sentiment scores or ratings, the total sentiment scores, or a combination thereof, to the design generator 206 for use in generating training data for further training the ML models. In some other implementations, the design improver 208 may be configured to determine reward values or reward possibilities based on the sentiment scores and to provide the reward values or reward possibilities to the design generator 206 for use in generating training data for further training the ML models. Additionally or alternatively, the reward values or reward probabilities may be used by the design generator 206 to tune one or more parameters or hyper parameters of the ML models. In some implementations, the design improver 208 may include or have access to a "multi-armed bandit" algorithm or model, such as a Bernoulli multi-armed bandit model, to determine the reward values or reward probabilities. The Bernoulli multi-armed bandit model may be described as a model having a combination of actions (A) and rewards (R) and that performs the steps of: (1) determining K possibilities with reward probabilities, {P1, ... , PK}; (2) at each time step t, taking an action a on one set of training data as well as training grid search set and receiving a reward r; (3) A is a set of actions, each referring to the interaction with one apparel design, and the value of action a is the expected reward; and (4) R is a reward function, and the reward r, in the case of the Bernoulli multi-armed bandit, is observed in a stochastic fashion at the time step t. In some implementations, sentiment/feedback scores may be assigned reward probabilities according to Table 3 below.

TABLE 3

| Sentiment/Feedback Score | Reward Probability |
| --- | --- |
| 0 | 0.05 |
| 1 | 0.1 |
| 2 | 0.12 |
| 3 | 0.3 |
| 4 | 0.6 |
| 5 | 0.7 |
| 6 | 0.8 |
| 7 | 1 |

Increasing the number of time steps may improve the reward probability, unless the reward probability is already at a maximum value, such a 1.0. Illustrative examples of time steps, reward probabilities, and tuning sets (e.g., parameter or hyper parameter values for tuning the ML models by the design generator 206) are shown below in Tables 4-6. Although tuning sets are described, the techniques may also be used for generating training data for the ML models by the design generator 206.

TABLE 4

| Time Step | Reward Probability | Tuning Set |
|---|---|---|
| t1 | 1 | N/A |

TABLE 5

| Time Step | Reward Probability | Tuning Set |
|---|---|---|
| t1 | 0.1 | Set 1 |
| t2 | 0.3 | Set 2 |
| t3 | 0.8 | Set 3 |
| t4 | 1 | N/A |

TABLE 6

| Time Step | Reward Probability | Tuning Set |
|---|---|---|
| t1 | 0.3 | Set 1 |
| t2 | 0.6 | Set 2 |
| t3 | 0.7 | Set 3 |
| t4 | 0.8 | Set 4 |
| t5 | 1 | N/A |

The recommendation engine 210 may be configured to perform operation to generate recommendations and/or to provide information to the design generator 206 to be used as training data to train the ML models to generate additional apparel designs. In some implementations, the recommendation engine 210 may include or correspond to the recommendation engine 148 of FIG. 1. The recommendation engine 210 may be configured to maintain user profiles for each user that include historical purchase data, historical sentiment data, historical apparel design data, historical ML parameter data, other information, or a combination thereof. In some implementations, the recommendation engine 210 may be configured to classify or group users based on vectors generated from the respective user profiles, such as by using a K-nearest neighbors algorithm, as further described with reference to FIG. 1. As an illustrative example, the users may be grouped using the K-nearest neighbor algorithm, or another technique, based on vectors that include historical purchase recency scores, historical purchase frequency scores, and sentiment/feedback scores, as shown in Table 7 below.

TABLE 7

| Historical Purchase Recency | Historical Purchase Frequency | Sentiment/Feedback Score | User |
|---|---|---|---|
| 1 | 2 | 7 | User 1 |
| 2 | 3 | 1 | User 2 |
| 1 | 1 | 6 | User 3 |
| 3 | 2 | 5 | User 4 |

The recommendation engine 210 may be configured to predict a group for an active user based on a vector based on the active user's profile and vectors associated with the groups, as described above with reference to FIG. 1. The recommendation engine 210 may be configured to perform one or more operations based on the predicted group. For example, the recommendation engine 210 may be configured to recommend additional apparel designs, add the additional design elements or apparel descriptions to be used by the design generator 206, and/or provide ML model parameters to the design generator 206 for tuning the parameters or hyper parameters of the ML models based on the historical purchase data, the historical apparel designs data, and/or the historical ML model parameter data, respectively, indicated by one or more user profiles of the predicted user group.

Figure 3:
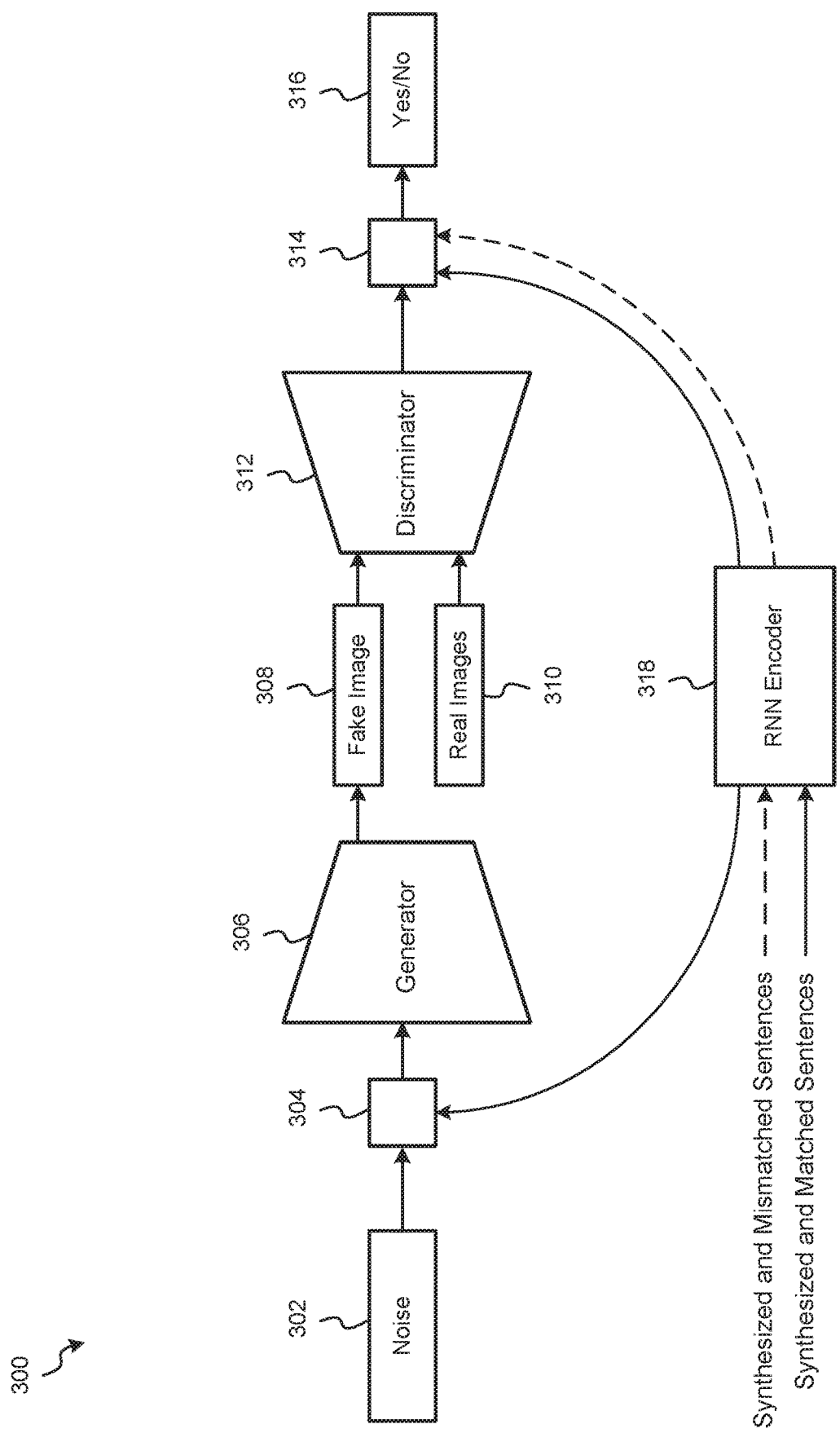
FIG. 3 is a block diagram of an example of a text-to-image synthesizer according to aspects of the present disclosure.

Referring to FIG. 3, an example of a text-to-image synthesizer according to aspects of the present disclosure is shown as text-to-image synthesizer 300. In some implementations, the text-to-image synthesizer 300 may include or correspond to one or more of the ML models 138 of FIG. 1 and may be included in the design generator 206 of FIG. 2. In some such implementations, the text-to-image synthesizer 300 may include or correspond to a generative adversarial network (GAN) configured to perform text to image synthesis, and the first ML model of the ML models 138 may include two GANs: a first GAN configured to generate apparel modifications based on text data (after NLP is performed on the text data) and a second GAN configured to generate visual design elements for the apparel based on the text data. The text-to-image synthesis may be based on the generative adversarial network—conditional latent space (GAN-CLS).

In the example shown in FIG. 3, the text-to-image synthesizer 300 is configured for training. As shown in FIG. 3, the text-to-image synthesizer 300 includes noise 302 (also referred to as a noise network), generator input 304, a generator 306 (e.g., a generator network), fake images 308, real images 310, a discriminator 312 (e.g., a matching aware discriminator network), comparer input 314, a comparer 316, and a recurrent neural network (RNN) encoder 318. At a high level, the discriminator 312 and the generator 306 may be configured to compete in a two-player minimax game in which the discriminator 312 tries to distinguish real training data from synthetic images and the generator 306 tries to fool the discriminator 312.

To illustrate, a conditional-GAN is typically configured to receive an input, a one-hot class label vector, and a randomly sampled noise vector, which may result in higher training stability and controllable generator output. For example, the noise 302 (e.g., a randomly sampled noise vector) and a vector output by the RNN encoder 318 may be provided as the generator input 304 to the generator 306. The RNN encoder 318 may be configured to receive text data representing synthesized and matched sentences (and optionally text data representing synthesized and mismatched sentences), and the RNN encoder 318 may be configured to generate vectors of embeddings, such as one-hot class label vectors, based on the text data. In this manner, the text-to-image synthesizer 300 may be conditioned on a text embedding learned by a deep neural network (e.g., the RNN encoder 318) instead of being configured to construct a sparse visual attribute descriptor to be conditioned on. Text to image translation may require a high multi-model, and the multi-model training may create an adaptive loss function. The generator 306 may be configured to filter a text embedding (e.g., the vector from the RNN encoder 318) through one or more fully connected layers and to concatenate the filtered text embedding with random noise (e.g., the noise 302). The discriminator 312 may be configured to compress the text embedding through one or more fully connected layers and to reshape the filtered text embedding into a matrix which is depth-wise concatenated with a respective image representation. The image representation may be produced after a respective input image is convolved multiple times, which may reduce the spatial resolution of the input image and extract information from the input image. Constructing a text embedding for visual attributes may be an important process, and may be related to an overall objective of a text classifier: optimizing the gated loss between two loss functions. A text embedding should have a higher compatibility score with images of the corresponding class that with images of any other class. The two terms may each represent an image encoder and a text encoder. The objective function may aim to minimize the distance between the image representation (e.g., image representations used as training data, such as image representations generated by the system 100 of FIG. 1 or the system 200 of FIG. 2, or image representations received from an external source, such as a cloud-based server or database) and the text representation from a character-level convolutional neural network or a long short-term memory (LSTM) network. Stated another way, the vector encoding for the image classification may be used to guide the text encodings based on similarity to similar images. With latent space additions, a latent vector z may be used to interpolate new instances of image representations. The discriminator 312 may be configured to predict whether image and text pairs match or not. Additionally, the images from interpolated text embeddings can fill in the gaps in the data manifold that are present during training.

In the example shown in FIG. 3, the generator 306 may be configured to generate the fake images 308 (e.g., fake image representations) based on the noise 302 and the embedding vectors from the RNN encoder 318. The discriminator 312 may be trained based on the fake images 308 and the real images 310 (e.g., image representations that correspond to the text used to generate the embedding vectors). As an illustrative example, if the text is "zig-zag bottom blue t-shirt," the fake images 308 may include an image representation of a teal t-shirt with no zig-zag pattern, and the real images 310 may include an image representation of a blue t-shirt having a zig-zag pattern along the bottom of the t-shirt. The output of the discriminator 312 (e.g., a text embedding with a highest reliability) and the embedding vector output by the RNN encoder 318 may be provided as the comparer input 314 to the comparer 316, and the comparer 316 may be configured to compare the inputs to determine whether the inputs are the same or similar (e.g., have are associated with a similarity score that satisfies a threshold, are included in the same class, etc.). The output of the comparer 316 may be provided back to at least the discriminator 312, such as by backpropagation, to further train the discriminator 312 to improve the reliability and quality of the discriminator 312. In this manner, the text-to-image synthesizer 300 may be trained to generate visual design elements (or apparel modifications) based on embedding vectors received from a natural language processor.

Figure 4:
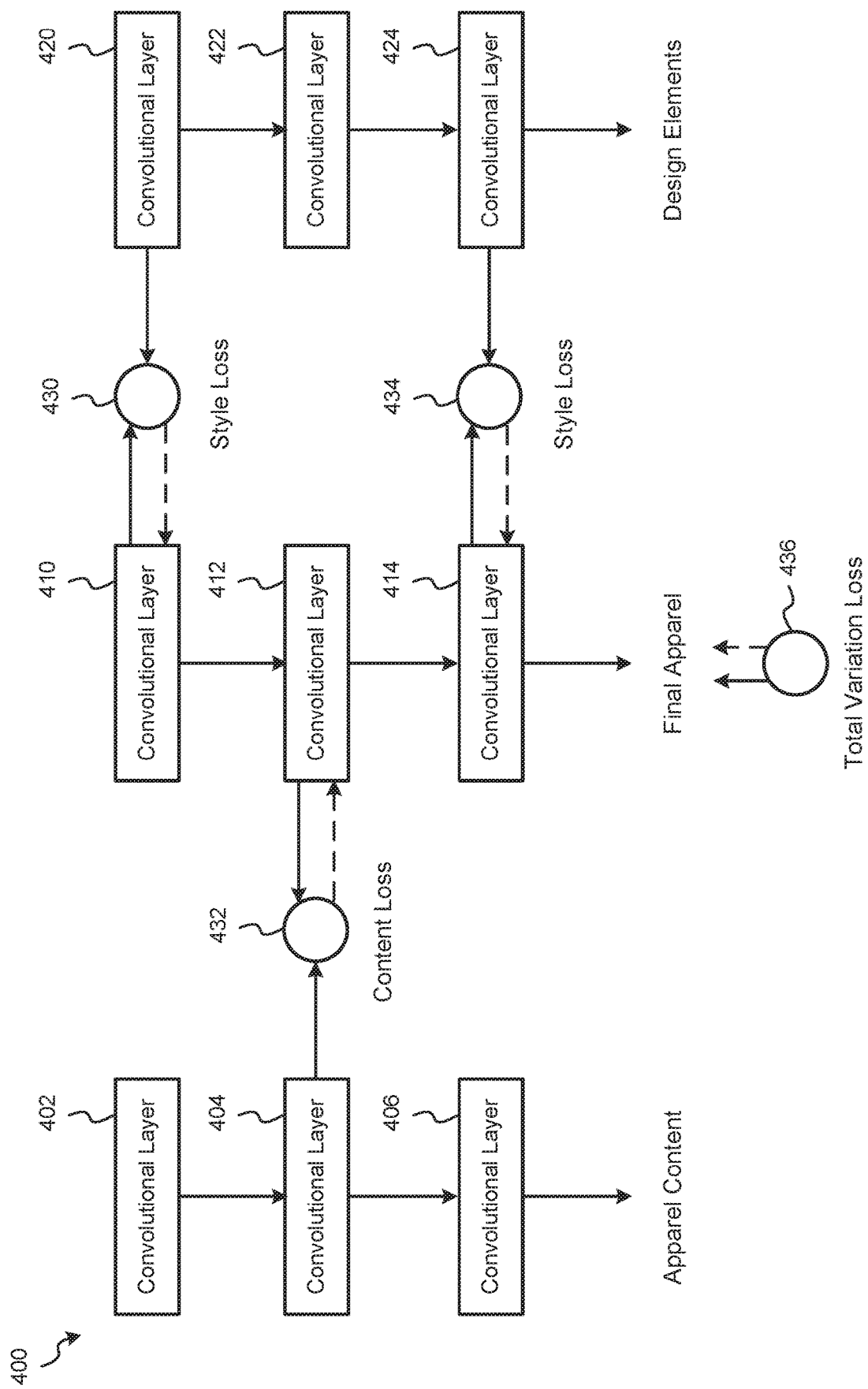
FIG. 4 is a block diagram of an example of a neural style transfer network according to aspects of the present disclosure.

Referring to FIG. 4, an example of a neural style transfer network according to aspects of the present disclosure is shown as neural style transfer network 400. In some implementations, the neural style transfer network 400 may include or correspond to one or more of the ML models 138 of FIG. 1 and may be included in the design generator 206 of FIG. 2. In some such implementations, the neural style transfer network 400 may include or correspond to the second ML model of the ML models 138 of FIG. 1. The neural style transfer network 400 may include or correspond to a multilayer convolutional neural network configured to create (e.g., generate) an apparel design. For example, the neural style transfer network 400 may be configured to combine images of visual design elements together into an image of an apparel design that has the appearance or visual/apparel style of images of apparel or apparel modifications.

As shown in FIG. 4, the neural style transfer network 400 includes multiple convolutional layers including a first convolutional layer 402, a second convolutional layer 404, a third convolutional layer 406, a fourth convolutional layer 410, a fifth convolutional layer 412, a sixth convolutional layer 414, a seventh convolutional layer 420, an eighth convolutional layer 422, and a ninth convolutional layer 424. The various convolutional layers may be configured to receive visual design elements and/or apparel modifications from one or more ML models, such as the text-to-image synthesizer 300 of FIG. 3, and to generate apparel design(s) based on the apparel modifications, apparel design(s) based on the visual design elements, a final apparel design, or a combination thereof. In the example shown in FIG. 4, the convolutional layers 402-406 may be configured to generate the apparel design(s) based on the apparel modification, the convolutional layers 420-424 may be configured to generate the apparel design(s) based on the visual design elements, and the convolutional layers 410-414 may be configured to generate the final apparel design. Although groups of three convolutional layers are shown as performing the operations in FIG. 4, in other implementations, groups having fewer than three or more than three convolutional layers may be configured to perform the operations. As an illustrative example, the neural style transfer network 400 may include nineteen layers.

The neural style transfer network 400 may be trained on training data including multiple images of apparel and visual design elements. In some implementations, the neural style transfer network 400 may be trained on more than one million images from one or more databases. Training the neural style transfer network 400 may include defining multiple cost functions, such as a content cost function, a style cost function, and a total cost function, as illustrative examples. The content cost function may be defined to result in a generated image being matched with the content of an input image. The layer activation of the generated image may be similar to the layer activation of the content image. To computer the content cost, three-dimensional (3D) volume of any images may be unrolled to two-dimensional (2D) volume. The style cost function may be supported by generating or determining a gram/style matrix formation, defining the style cost function, assigning style weights, and combining the style cost function weight and the gram/style matrix. The total cost function may be defined to combine the content cost function and the style cost function. The neural style transfer network 400 may be trained to optimize the cost function and apparel design image generation.

In the illustrative example shown in FIG. 4, a style loss function 430 may be determined based at least in part on the outputs of the fourth convolutional layer 410 and the seventh convolutional layer 420, a content loss function 432 may be determined based at least in part on the outputs of the second convolutional layer 404 and the fifth convolutional layer 412, and a style loss function 434 may be determined based at least in part on the outputs of the sixth convolutional layer 414 and the ninth convolutional layer 424. The style loss for the style loss function 430 may be provided to (or used to train or tune) the fourth convolutional layer 410, the content loss for the content loss function 432 may be provided to (or used to train or tune) the fifth convolutional layer 412, and the style loss for the style loss function 434 may be provided to (or used to train or tune) the sixth convolutional layer 414. In other implementations, fewer than three or more than three loss functions may be determined, and the various losses of the loss functions may be used with respect to other convolutional layers. A total variation loss function 436 may be determined based at least in part on the output of the sixth convolutional layer 414 (e.g., the final apparel design) and the style loss function 430, the content loss function 432, and the style loss function 434. The neural style transfer network 400 may be trained to reduce the variation loss for the total variation loss function 436, such as until the variation loss satisfies a threshold or until the variation loss is minimized.

Figure 5:
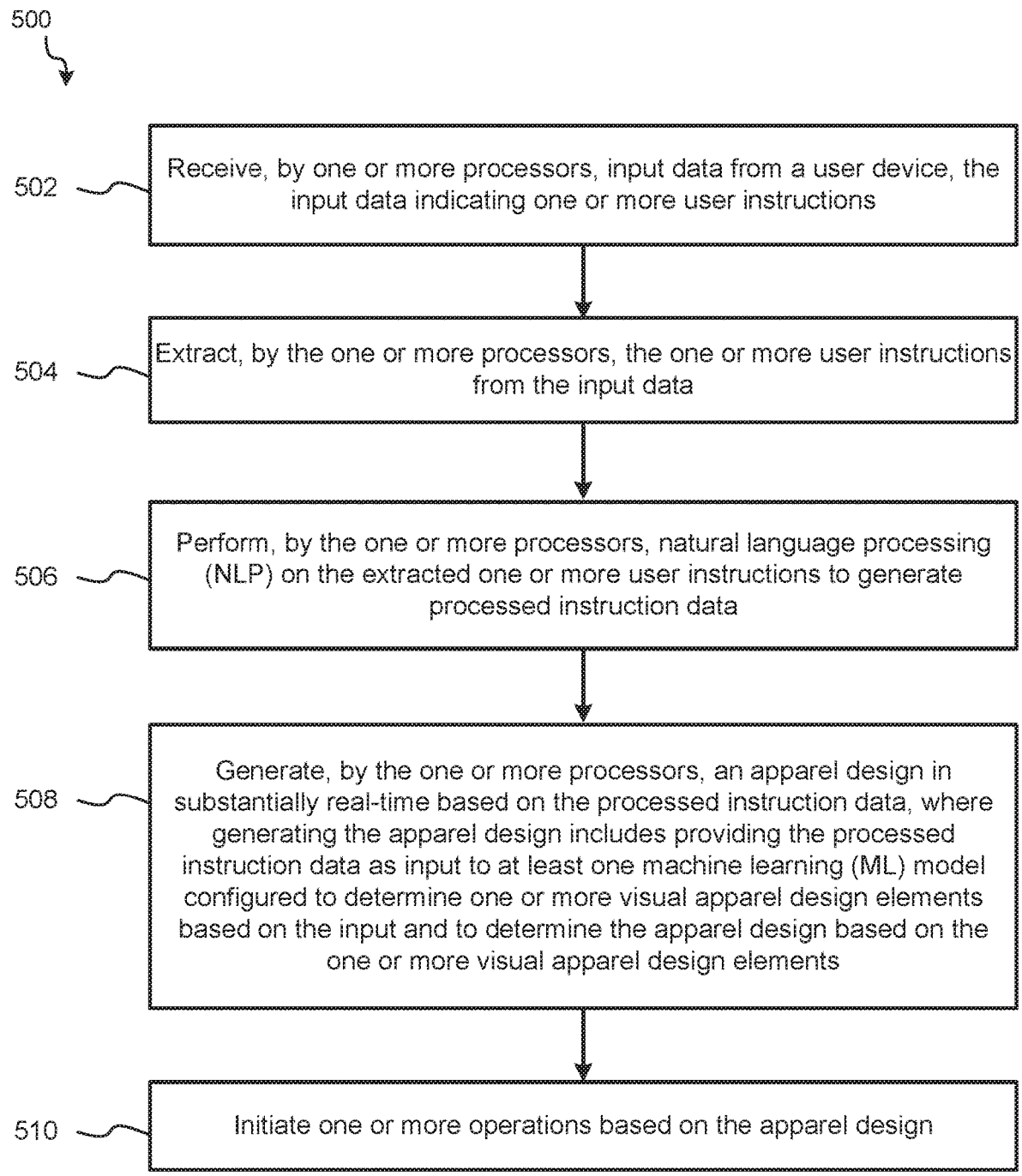
FIG. 5 is a flow diagram illustrating a method for automated machine learning apparel design according to aspects of the present disclosure.

Referring to FIG. 5, a flow diagram of a method for automated machine learning for visual design according to aspects of the present disclosure is shown as a method 500. In some implementations, the operations of the method 500 may be stored as instructions that, when executed by one or more processors (e.g., the one or more processors of a computing device of an apparel designer or an apparel design company), cause the one or more processors to perform the operations of the method 500. In some implementations, the method 500 may be performed by a computing device, such as the server 120 of FIG. 1 (e.g., a computer device configured for apparel design).

The method 500 includes receiving, by one or more processors, input data from a user device, at 502. The input data indicates one or more user instructions. For example, the server 120 may receive input data from the user device 102, and the input data may indicate one or more user instructions entered using the user device 102. The method 500 also includes extracting, by the one or more processors, the one or more user instructions from the input data, at 504. For example, if the input data includes audio data, the speech-to-text converter 132 may convert the audio data to text data representing the user instructions. Extracting the user instructions may optionally include pre-processing the text data to discard text, spacing, punctuation, etc., that is not related to the user instructions.

The method 500 includes performing, by the one or more processors, natural language processing (NLP) on the extracted one or more user instructions to generate processed instruction data, at 506. For example, the natural language processor 134 may perform one or more NLP operations on the text data received from the user device 102 or generated by the speech-to-text converter 132. The method 500 also includes generating, by the one or more processors, an apparel design in real-time/substantially real-time based on the processed instruction data, at 508. Generating the apparel design includes: providing the processed instruction data as input to at least one machine learning (ML) model configured to indicate one or more visual apparel design elements based on the input and to determine the apparel design based on the one or more visual apparel design elements. For example, the design generation engine 136 may generate the apparel design in real-time/substantially real-time, and the at least one ML model may include or correspond to the ML models 138. In some implementations, the at least one ML model may include a first ML model and a second ML model, the processed instruction data may be provided as input to the first ML model that is configured to determine the one or more visual apparel design elements based on the input, and an output of the first ML model may be provided as input to the second ML model that is configured to determine the apparel design based on the one or more visual design elements. Alternatively, the at least one ML model may include a single ML model or more than two ML models configured to determine the apparel design. In some implementations, the one or more visual apparel design elements include text, logos, patterns, colors, apparel components, design sizes, design locations, or a combination thereof, indicated by the processed instruction data. The method 500 further includes initiating one or more operations based on the apparel design, at 510. For example, the server 120 may transmit data indicating the apparel design to the user device 102, store the data indicating the apparel design at the memory 124, or initiate a transaction based on the apparel design, as illustrative examples.

In some implementations, the first ML model may include or correspond to multiple generative adversarial networks (GANs) configured to identify the one or more visual apparel design elements represented by the processed instruction data, as described with reference to FIGS. 1 and 3. Additionally or alternatively, the second ML model may include or correspond to a convolutional neural network configured to determine the apparel design based on the one or more visual apparel design elements and one or more cost functions, as described with reference to FIGS. 1 and 4. Additionally or alternatively, the input data may include audio data representing user speech, and extracting the one or more user instructions from the input data may include performing speech-to-text conversion on the audio data to generate text data including the extracted one or more user instructions. For example, the speech-to-text convert 132 may perform speech-to-text conversion on the audio data to generate the text data.

In some implementations, the extracted one or more user instructions may be included in text data, and performing the NLP on the extracted one or more user instructions may include performing vectorization on the text data to generate a plurality of vectors associated with phrases within the text data, each vector of the plurality of vectors including one or more embeddings. For example, the natural language processor 134 may perform vectorization on the text data to generate a plurality of phrase vectors. In some such implementations, performing the NLP on the extracted one or more user instructions may further include performing entity recognition on the plurality of vectors to identify one or more design elements, one or more apparel descriptions, or a combination thereof. For example, the natural language processor 134 may perform NER on the plurality of vectors to identify one or more visual design elements, one or more apparel descriptions, or a combination thereof.

In some implementations, the method 500 may also include transmitting image data representing the apparel design to the user device to cause display of a virtual scene at the user device. The virtual scene includes a visual representation of the user wearing a representation of apparel (e.g., virtual apparel) having the apparel design. For example, the virtual changing room manager 140 may generate visual data (e.g., image data, video data, VR data, AR data, or the like) that indicates a virtual scene including a representation of the user wearing a representation of apparel having the apparel design generated by the design generation engine 136. In some such implementations, the method 500 may include determining feedback data indicating a preference for the apparel design. In some such implementations, the method 500 may further include enabling one or more controls at the user device with respect to the virtual scene. The one or more controls include approval of the apparel design, disapproval of the apparel design, selection of another similar apparel design, or a combination thereof. For example, the virtual changing room manager 140 may support multiple controls for controlling aspects of the virtual changing room. In some such implementations, the method 500 may also include receiving second input data from the user device. The second input data indicates one or more selected controls with respect to the virtual scene. The method 500 may also include determining user sentiment associated with the apparel design based on the one or more selected controls and determining the feedback data based at least in part on the determined user sentiment. For example, the emotion recognizer 144 may determine emotions and user sentiment scores or ratings based on the selected controls, and the user sentiment scores or ratings may be used to determine sentiment/ feedback data. In some such implementations, the second input data includes image data, and the method 500 may include performing gesture recognition on the second input data to identify the one or more selected controls and mapping each of the one or more selected controls to a respective sentiment value to determine the user sentiment. For example, the gesture detector 142 may perform gesture recognition on image data from the user device 102 to identify the selected controls, and the emotion recognizer 144 may map the selected controls to user sentiment scores or ratings. In some such implementations, the method 500 may further include performing facial state recognition on the second input data to identify one or more facial states and determining the user sentiment based further on the one or more facial states. For example, the emotion recognizer 144 may perform facial state recognition on the image data from the user device 102 to identify facial states, and the facial states may be used to determine user sentiment scores or ratings.

Additionally or alternatively, in some implementations in which the user sentiment associated with the apparel design is determined based on the one or more selected controls, the second input data may include audio data representing user speech, and the method 500 may also include performing speech to text conversion on the second input data to identify the one or more selected controls and mapping each of the one or more selected controls to a respective sentiment value to determine the user sentiment. For example, the speech-to-text converter 132 may generate text data based on the audio data from the user device 102, and the emotion recognizer 144 may map the selected controls indicated by the text data to user sentiment scores or ratings. In some such implementations, the method 500 may further include determining one or more audio levels based on the second input data, one or more audio features based on the second input data, or a combination thereof, and determining the user sentiment based further on the one or more audio levels, the one or more audio features, or a combination thereof. For example, the emotion recognizer 144 may determine one or more audio levels or features based on the audio data, and the one or more audio levels or features may be used to determine the user sentiment scores or ratings.

Additionally or alternatively, in some implementations in which feedback/sentiment data is determined, the method 500 may also include initiating distribution of one or more social media messages that indicate the apparel design, obtaining social media data indicating responses to the one or more social media messages, processing the social media data to determine scores based on the responses, and determining the feedback data based at least in part on the scores. For example, the social media analyzer 146 may distribute social media messages indicating the apparel design, obtain social media data related to the social media messages, process the social media data (e.g., analyze reply messages or comments, reactions, shares or retransmissions of the social media messages, keywords included in the reply messages or comments, etc.), and determine the sentiment/ feedback data based at least in part on the analysis of the social media data. Additionally or alternatively, the method 500 may also include tuning one or more parameters for the first ML model, one or more parameters for the second ML model, or a combination thereof, based on the feedback data. For example, the emotion recognizer 144 and/or the social media analyzer 146 may generate the sentiment/feedback data, and the design generation engine 136 may further train the ML models 138 using training data generated based at least in part on the sentiment/feedback data.

In some implementations, the one or more operations include transmitting data indicating the apparel design to the user device, storing the data indicating the apparel design at a memory, initiating a transaction associated with the apparel design, or a combination thereof. Additionally or alternatively, the method 500 may further include maintaining a user profile associated with the user. The user profile includes historical transaction data associated with the user, historical feedback data associated with previous apparel designs for the user, or a combination thereof. The method 500 may also include identifying one or more user profiles (including additional transaction data, additional feedback data, or a combination thereof) that are similar to the user profile and modifying the apparel design, tuning one or more parameters for the first ML model, tuning one or more parameters for the second ML model, or a combination thereof, based on the additional transaction data, the additional feedback data, or a combination thereof. For example, the recommendation engine 148 may maintain user profiles, identify a group of users to which an active user is predicted to belong, and perform one or more operations, such as providing a recommendation or providing data to the design generation engine 136, based on the user profiles of the group of users predicted for the active user.

Figure 6:
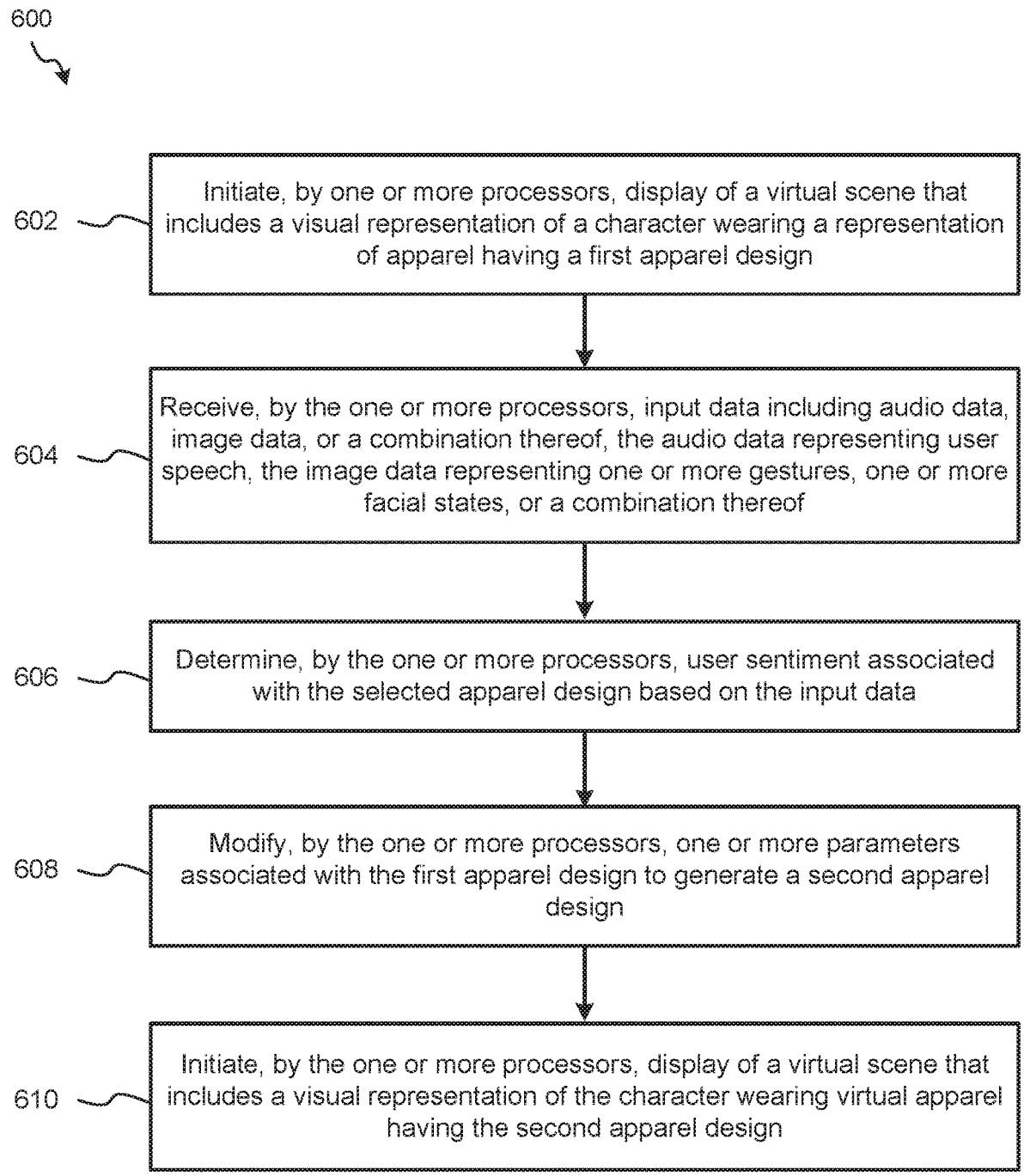
FIG. 6 is a flow diagram illustrating a method for modifying display of virtual apparel based on user sentiment according to aspects of the present disclosure.

Referring to FIG. 6, a flow diagram of a method for modifying display of virtual apparel based on user sentiment according to aspects of the present disclosure is shown as a method 600. In some implementations, the operations of the method 600 may be stored as instructions that, when executed by one or more processors (e.g., the one or more processors of a computing device of an apparel designer or an apparel design company), cause the one or more processors to perform the operations of the method 600. In some implementations, the method 600 may be performed by a computing device, such as the server 120 of FIG. 1 (e.g., a computer device configured for display of virtual apparel).

The method 600 includes initiating, by one or more processors, display of a virtual scene that includes a visual representation of a character wearing a representation of apparel (e.g., virtual apparel) having a first apparel design, at 602. For example, the virtual changing room manager 140 may initiate display of a virtual changing room that includes a virtual representation of a character wearing a representation of apparel having a first apparel design generated by the design generation engine 136. The method 600 also includes receiving, by the one or more processors, input data including audio data, image data, or a combination thereof, at 604. The audio data represents user speech. The image data represents one or more gestures, one or more facial states, or a combination thereof. For example, the server 120 may receive audio data and/or visual data from the user device 102 based on display of the virtual changing room at the user device 102.

The method 600 includes determining, by the one or more processors, user sentiment associated with the selected apparel design based on the input data, at 606. For example, the emotion recognizer 144 may determine user sentiment scores or ratings based on the audio data and/or the image data. The method 600 also includes modifying, by the one or more processors, one or more parameters associated with the first apparel design to generate a second apparel design, at 608. For example, the emotion recognizer 144 may provide the user sentiment scores or ratings to the design generation engine 136 for use in generating training data for training the ML models 138 or for tuning parameters or hyper parameters of the ML models 138, thereby causing modification of the apparel design generated by the design generation engine 136.

The method 600 further includes initiating, by the one or more processors, display of a virtual scene that includes a visual representation of the character wearing virtual apparel having the second apparel design, at 610. For example, the virtual changing room manager 140 may initiate display of a representation of apparel having a second apparel design generated by the design generation engine 136 after training the ML models 138 or tuning the parameters or hyper parameters of the ML models 138.

In some implementations, the character may include a representation of the user. For example, the virtual changing room manage 140 may generate a representation of the user based on image data that includes the user from the user device 102. Alternatively, the character may include an avatar or another type of virtual character.

In some implementations, the first apparel design and the second apparel design may be generated in real-time/substantially real-time based on user instructions. For example, the design generation engine 136 may generate the first apparel design and the second apparel design using the ML models 138. Alternatively, the first apparel design and the second apparel design may be selected from a plurality of pre-generated apparel designs.

In some implementations, determining the user sentiment may include determining one or more audio levels based on the audio data and determining the user sentiment based on the one or more audio levels. For example, the emotion recognizer 144 may receive the audio data from the user device 102, determine one or more audio levels based on the audio levels, such as by using one or more ML models, and determine the user sentiment scores or ratings based on the one or more audio levels, such as by using one or more other ML models. Additionally or alternatively, determining the user sentiment may include performing facial state recognition based on the image data and determining the user sentiment based on one or more detected facial states. For example, the emotion recognizer 144 may receive the image data from the user device 102, perform facial state recognition on the image data to detect one or more facial states, such as by using one or more ML models, and determine the user sentiment scores or ratings based on the one or more facial states, such as by using one or more other ML models.

It is noted that other types of devices and functionality may be provided according to aspects of the present disclosure and discussion of specific devices and functionality herein have been provided for purposes of illustration, rather than by way of limitation. It is also noted that the method 500, the method 600, or both, may also include other functionality or operations consistent with the description of the operations of the system 100 of FIG. 1, the system 200 of FIG. 2, the text-to-image synthesizer 300 of FIG. 3, and/or the neural style transfer network 400 of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-6) may comprise processors, electronics devices, hardware devices, electronics components, logical circuits, memories, software codes, firmware codes, etc., or any combination thereof. In addition, features discussed herein relating to FIGS. 1-6 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within a percentage of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for automated machine learning for visual design, the method comprising:
   receiving, by one or more processors, input data from a user device, the input data indicating one or more user instructions;
   extracting, by the one or more processors, the one or more user instructions from the input data;
   performing, by the one or more processors, natural language processing (NLP) on the extracted one or more user instructions to generate processed instruction data;
   generating, by the one or more processors, an apparel design in substantially real-time based on the processed instruction data, wherein generating the apparel design comprises:
      providing the processed instruction data as input to at least one machine learning (ML) model, the at least one ML model configured to:
         determine one or more visual apparel design elements based on the input, and
         determine the apparel design based on the one or more visual apparel design elements; and
      initiating one or more operations based on the apparel design.

2. The method of claim 1, wherein the one or more ML models includes a first ML model that comprises multiple generative adversarial networks (GANs) configured to identify the one or more visual apparel design elements represented by the processed instruction data.

3. The method of claim 1, wherein the one or more ML models includes a second ML model that comprises a convolutional neural network configured to determine the apparel design based on the one or more visual apparel design elements and one or more cost functions.

4. The method of claim 1, wherein:
   the input data comprises audio data representing user speech, and
   extracting the one or more user instructions from the input data comprises performing speech-to-text conversion on the audio data to generate text data including the extracted one or more user instructions.

5. The method of claim 1, wherein:
   the extracted one or more user instructions are included in text data, and
   performing the NLP on the extracted one or more user instructions comprises performing vectorization on the text data to generate a plurality of vectors associated with phrases within the text data, each vector of the plurality of vectors including one or more embeddings.

6. The method of claim 5, wherein performing the NLP on the extracted one or more user instructions further comprises performing entity recognition on the plurality of vectors to identify one or more design elements, one or more apparel descriptions, or a combination thereof.

7. A non-transitory computer-readable storage medium storing instructions that, when executed by one or more processors, cause the one or more processors to perform operations for automated machine learning for visual design, the operations comprising:
   receiving input data from a user device, the input data indicating one or more user instructions;
   extracting the one or more user instructions from the input data;
   performing natural language processing (NLP) on the extracted one or more user instructions to generate processed instruction data;
   generating an apparel design in substantially real-time based on the processed instruction data, wherein generating the apparel design comprises:
      providing the processed instruction data as input to at least one machine learning (ML) model, the at least one ML model configured to:
         determine one or more visual apparel design elements based on the input, and
         determine the apparel design based on the one or more visual apparel design elements; and
      initiating one or more operations based on the apparel design.

8. The non-transitory computer-readable storage medium of claim 7, wherein the operations further comprise transmitting image data representing the apparel design to the user device to cause display of a virtual scene at the user device, the virtual scene including a visual representation of the user wearing a representation of apparel having the apparel design.

9. The non-transitory computer-readable storage medium of claim 8, wherein the operations further comprise determining feedback data indicating a preference for the apparel design.

10. The non-transitory computer-readable storage medium of claim 9, wherein the operations further comprise enabling one or more controls at the user device with respect to the virtual scene, the one or more controls including approval of the apparel design, disapproval of the apparel design, selection of another similar apparel design, or a combination thereof.

11. The non-transitory computer-readable storage medium of claim 10, wherein the operations further comprise:
    receiving second input data from the user device, the second input data indicating one or more selected controls with respect to the virtual scene;
    determining user sentiment associated with the apparel design based on the one or more selected controls; and
    determining the feedback data based at least in part on the determined user sentiment.

12. The non-transitory computer-readable storage medium of claim 11, wherein:
    the second input data comprises image data, and
    the operations further comprise:
       performing gesture recognition on the second input data to identify the one or more selected controls, and
       mapping each of the one or more selected controls to a respective sentiment value to determine the user sentiment.

13. The non-transitory computer-readable storage medium of claim 12, wherein the operations further comprise:
    performing facial state recognition on the second input data to identify one or more facial states; and
    determining the user sentiment based further on the one or more facial states.

14. The non-transitory computer-readable storage medium of claim 11, wherein:
the second input data comprises audio data representing user speech, and
the operations further comprise:
performing speech to text conversion on the second input data to identify the one or more selected controls, and
mapping each of the one or more selected controls to a respective sentiment value to determine the user sentiment.

15. The non-transitory computer-readable storage medium of claim 14, wherein the operations further comprise:
determining one or more audio levels based on the second input data, one or more audio features based on the second input data, or a combination thereof; and
determining the user sentiment based further on the one or more audio levels, the one or more audio features, or a combination thereof.

16. The non-transitory computer-readable storage medium of claim 9, wherein the operations further comprise:
initiating distribution of one or more social media messages that indicate the apparel design;
obtaining social media data indicating responses to the one or more social media messages;
processing the social media data to determine scores based on the responses; and
determining the feedback data based at least in part on the scores.

17. The non-transitory computer-readable storage medium of claim 9, wherein the operations further comprise tuning one or more parameters for the at least one ML model based on the feedback data.

18. A system for automated machine learning apparel design, the system comprising:
a memory; and
one or more processors communicatively coupled to the memory, the one or more processors configured to:
receive input data from a user device, the input data indicating one or more user instructions;
extract the one or more user instructions from the input data;
perform natural language processing (NLP) on the extracted one or more user instructions to generate processed instruction data;
generate an apparel design in substantially real-time based on the processed instruction data, wherein generating the apparel design comprises:
providing the processed instruction data as input to at least one machine learning (ML) model, the at least one ML model configured to:
determine one or more visual apparel design elements based on the input, and
determine the apparel design based on the one or more visual design elements, the one or more visual apparel design elements including text, logos, patterns, colors, apparel components, design sizes, design locations, or a combination thereof, indicated by the processed instruction data; and
initiate one or more operations based on the apparel design.

19. The system of claim 18, wherein the one or more processors are configured to:
transmit data indicating the apparel design to the user device,
store the data indicating the apparel design at the memory,
initiate a transaction associated with the apparel design, or a combination thereof.

20. The system of claim 18, wherein the one or more processors are further configured to:
maintain a user profile associated with the user, the user profile including historical transaction data associated with the user, historical feedback data associated with previous apparel designs for the user, or a combination thereof;
identify one or more user profiles that are similar to the user profile, the one or more user profiles including additional transaction data, additional feedback data, or a combination thereof; and
modify the apparel design, tune one or more parameters for the at least one ML model, or a combination thereof, based on the additional transaction data, the additional feedback data, or a combination thereof.

* * * * *